United States Patent
Hada

(10) Patent No.: US 12,162,354 B2
(45) Date of Patent: Dec. 10, 2024

(54) DISPLAY CONTROL DEVICE, HEAD-UP DISPLAY DEVICE, AND DISPLAY CONTROL METHOD

(71) Applicant: NIPPON SEIKI CO., LTD., Niigata (JP)

(72) Inventor: Makoto Hada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 18/555,973

(22) PCT Filed: Apr. 28, 2022

(86) PCT No.: PCT/JP2022/019392
§ 371 (c)(1),
(2) Date: Oct. 18, 2023

(87) PCT Pub. No.: WO2022/230995
PCT Pub. Date: Nov. 3, 2022

(65) Prior Publication Data
US 2024/0375516 A1 Nov. 14, 2024

(30) Foreign Application Priority Data
Apr. 30, 2021 (JP) .................... 2021-077871

(51) Int. Cl.
*B60K 35/233* (2024.01)
*B60K 35/21* (2024.01)
*B60K 35/235* (2024.01)

(52) U.S. Cl.
CPC .......... *B60K 35/233* (2024.01); *B60K 35/211* (2024.01); *B60K 35/213* (2024.01);
(Continued)

(58) Field of Classification Search
CPC .. B60K 35/233; B60K 35/211; B60K 35/213; B60K 35/235; B60K 2360/166; B60K 2360/177; B60K 2360/31
See application file for complete search history.

(56) References Cited

U.S. PATENT DOCUMENTS

2010/0164702 A1 7/2010 Sasaki et al.
2017/0050542 A1 2/2017 Shigeta et al.
(Continued)

FOREIGN PATENT DOCUMENTS

JP 2010-156608 A 7/2010
JP 2015-87619 A 5/2015
(Continued)

OTHER PUBLICATIONS

International Search Report issued in corresponding International Application No. PCT/JP2022/019392, dated Jul. 26, 2022, w/ English Translation (4 pages).

*Primary Examiner* — Premal R Patel
(74) *Attorney, Agent, or Firm* — Rimon P.C.

(57) ABSTRACT

Positional correction of an image occurring along with detection of a shift in vertical eye position unintended by the user is suppressed. First image correction corrects the position of an image displayed on a display device based on a vertical eye position and a lateral eye position. Second image correction corrects the position of the image displayed on the display device based on the vertical eye position and the lateral eye position. A second correction amount to the position of the image with respect to the amount of change in the vertical eye position is smaller than a first correction amount to the position of the image with respect to the amount of change in the vertical eye position during the first image correction. A processor switches between the first image correction and the second image (Continued)

correction in accordance with whether a prescribed condition is satisfied.

11 Claims, 10 Drawing Sheets

(52) U.S. Cl.
CPC ...... *B60K 35/235* (2024.01); *B60K 2360/166* (2024.01); *B60K 2360/177* (2024.01); *B60K 2360/31* (2024.01)

(56) References Cited

U.S. PATENT DOCUMENTS

| | | | |
|---|---|---|---|
| 2019/0025685 A1* | 1/2019 | Chung | H04N 9/3188 |
| 2019/0096121 A1 | 3/2019 | Kang et al. | |
| 2021/0107356 A1* | 4/2021 | Watanabe | G06V 20/20 |
| 2021/0165220 A1* | 6/2021 | Nakada | B60W 40/08 |
| 2021/0174767 A1* | 6/2021 | Edgren | G06V 40/18 |

FOREIGN PATENT DOCUMENTS

| | | | |
|---|---|---|---|
| JP | 2019-062532 A | 4/2019 | |
| JP | 2019-169828 A | 10/2019 | |
| WO | 2015/162781 A1 | 10/2015 | |
| WO | 2018/193708 A1 | 10/2018 | |
| WO | 2019/097918 A1 | 5/2019 | |

\* cited by examiner

[FIG. 1]
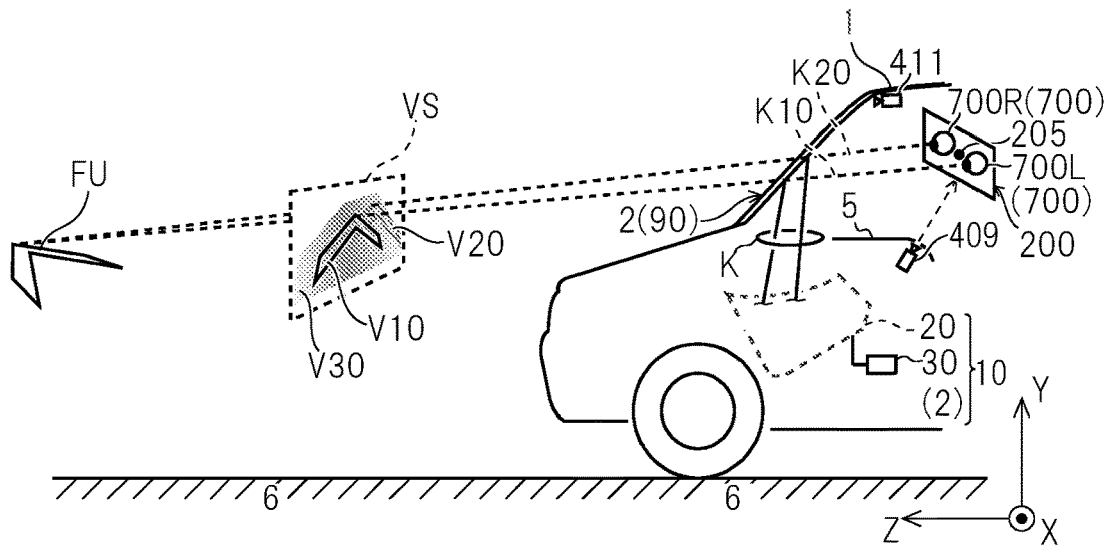
[FIG. 2]
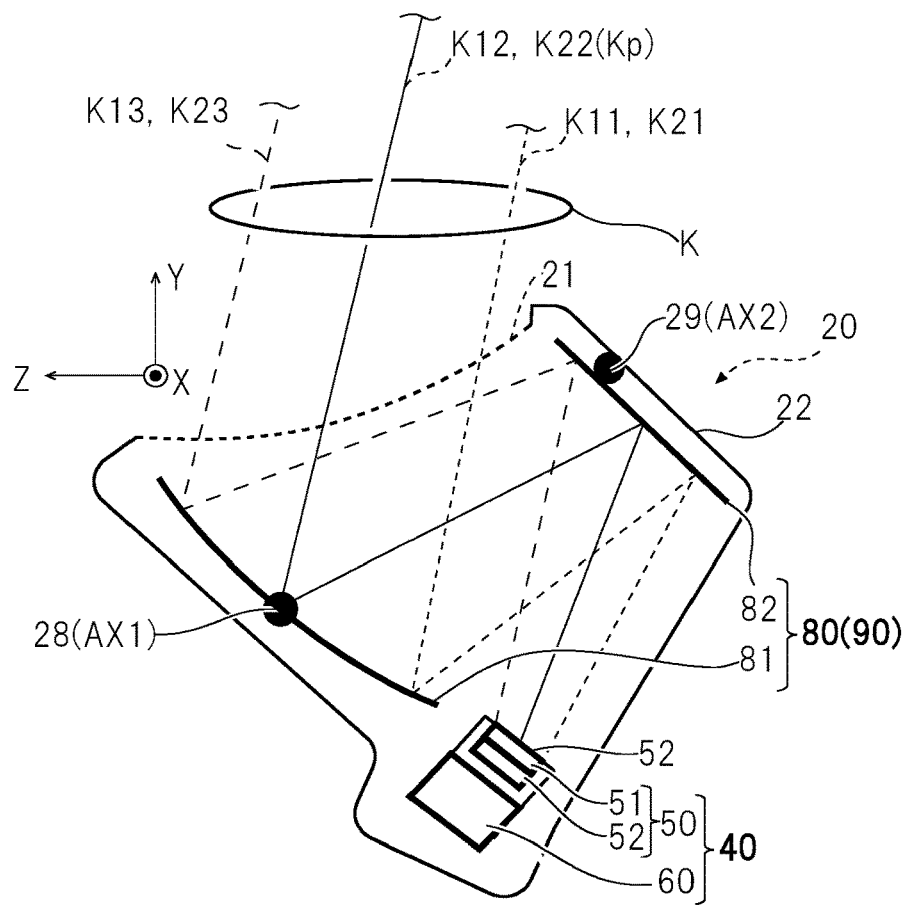

[FIG. 3]
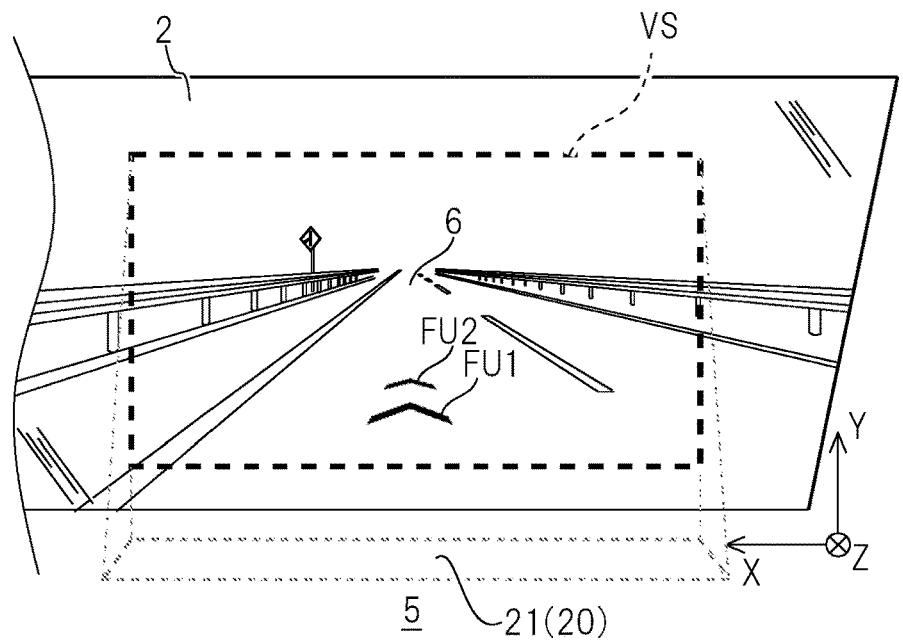
[FIG. 4]
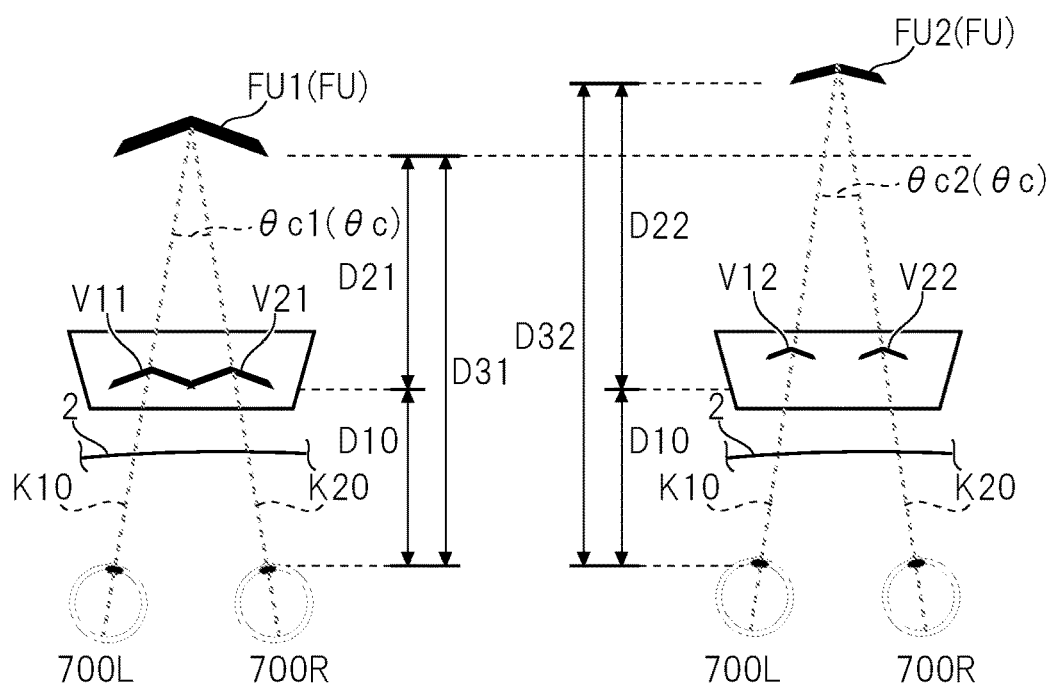

[FIG. 5]
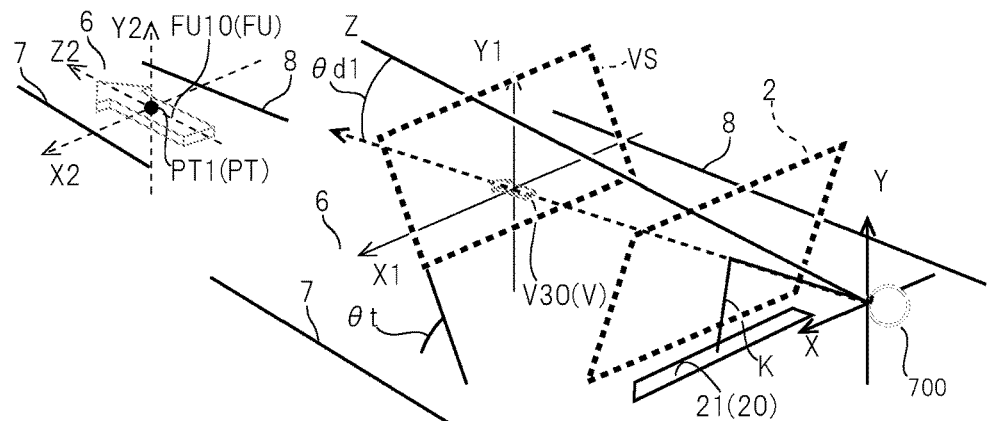
[FIG. 6]
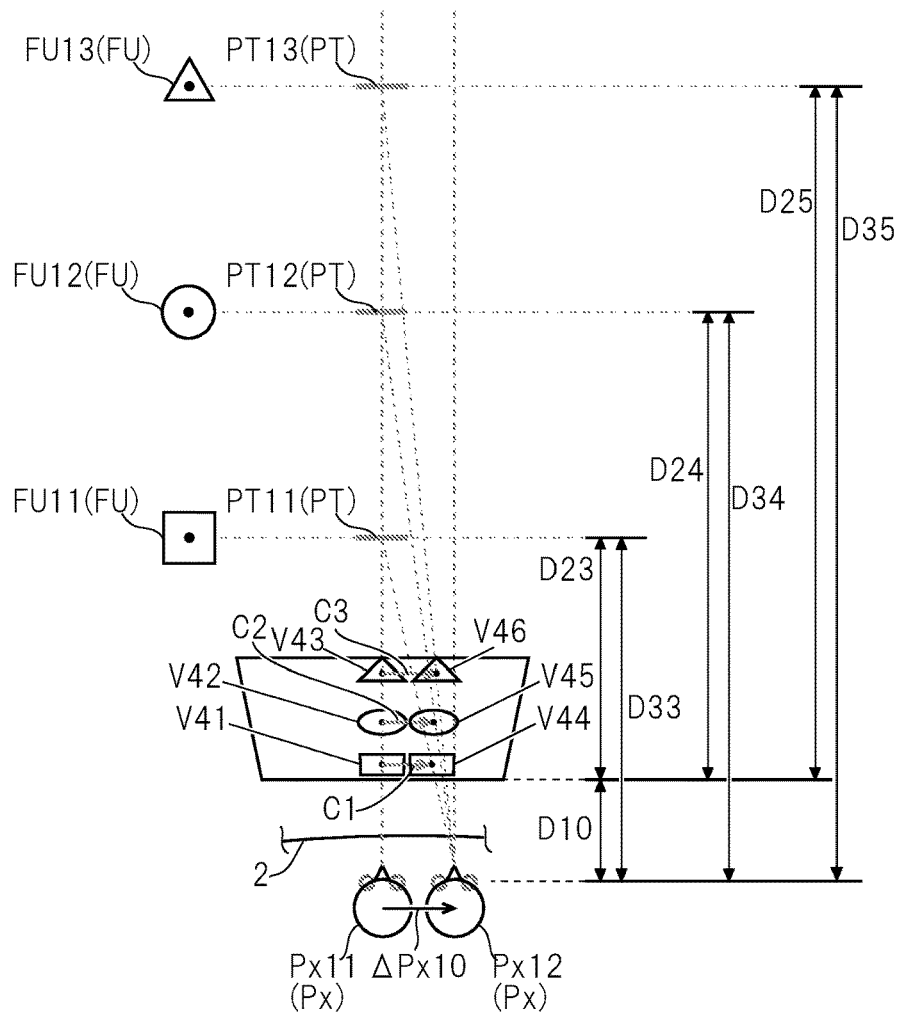

[FIG. 7A]
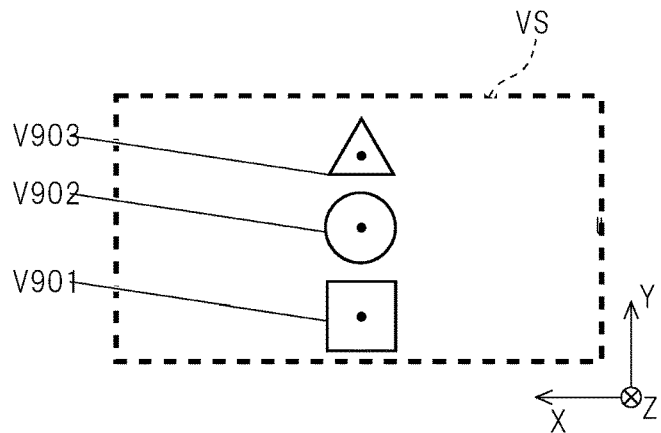
[FIG. 7B]
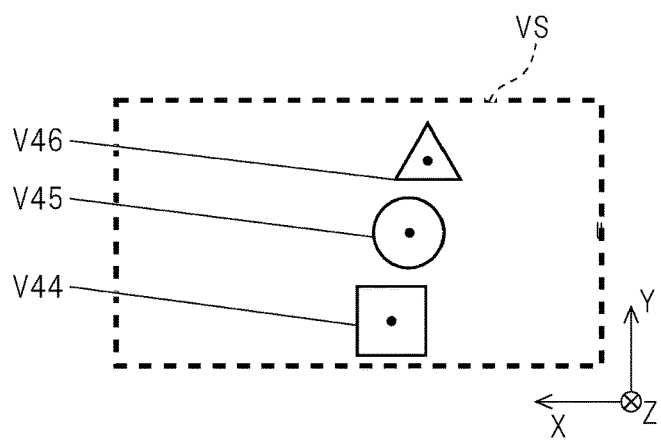
[FIG. 8]
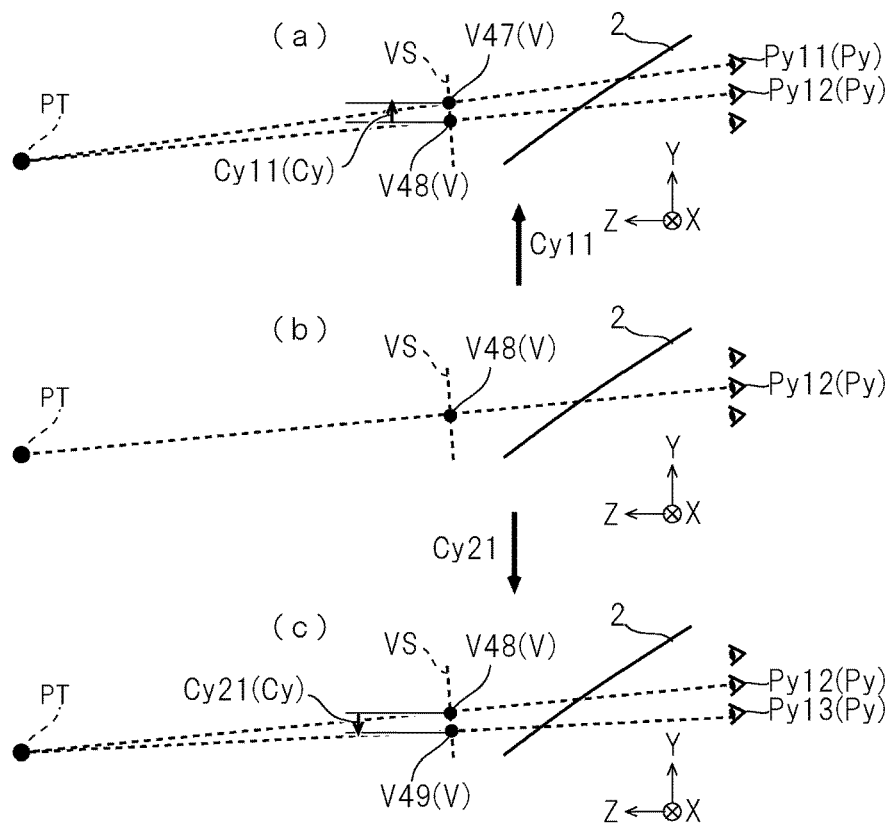

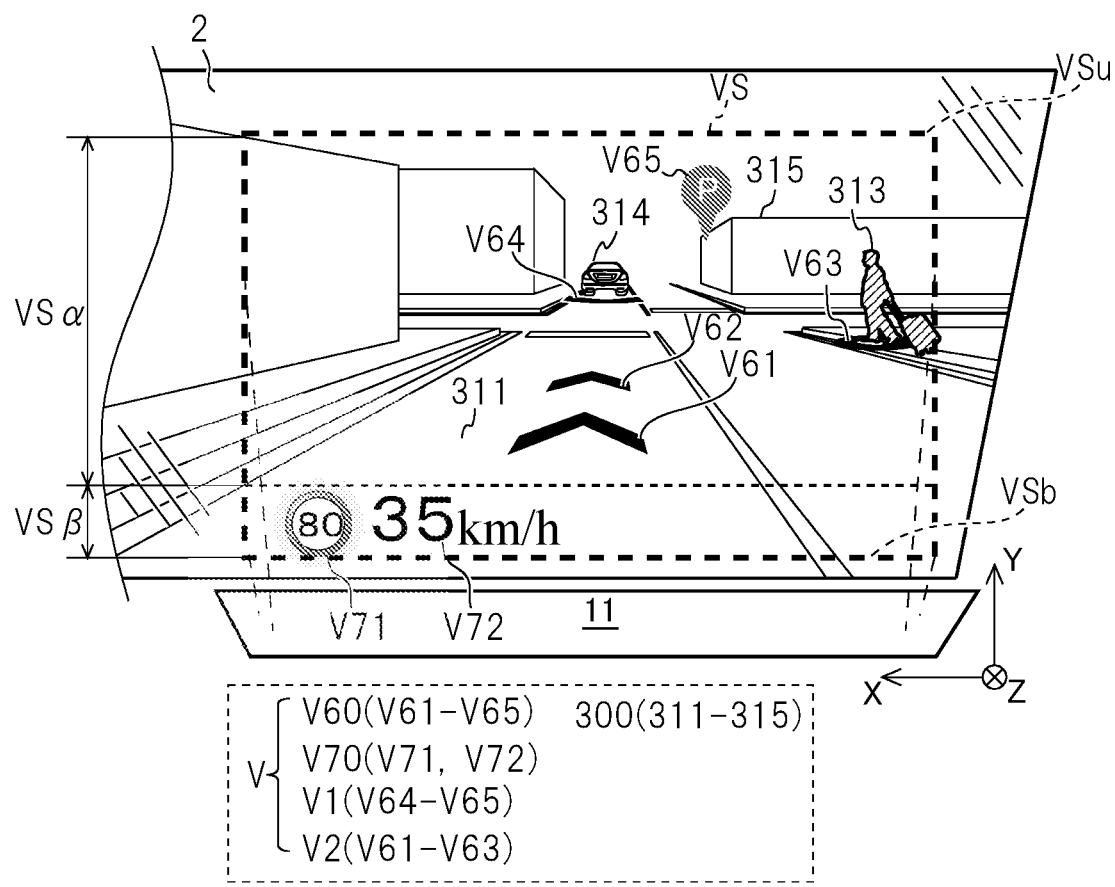
[FIG. 9]

[FIG. 10]
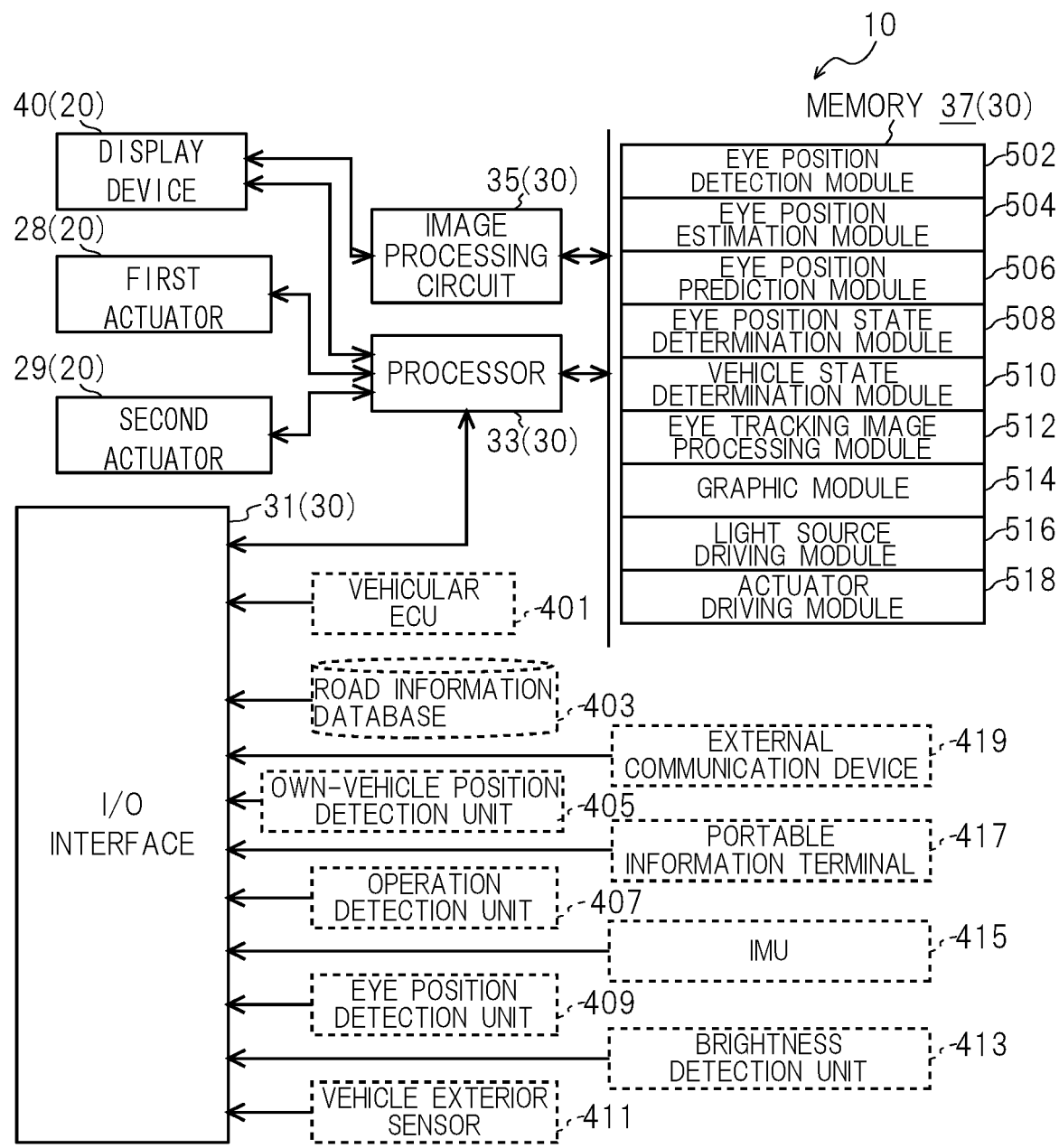

[FIG. 11A]
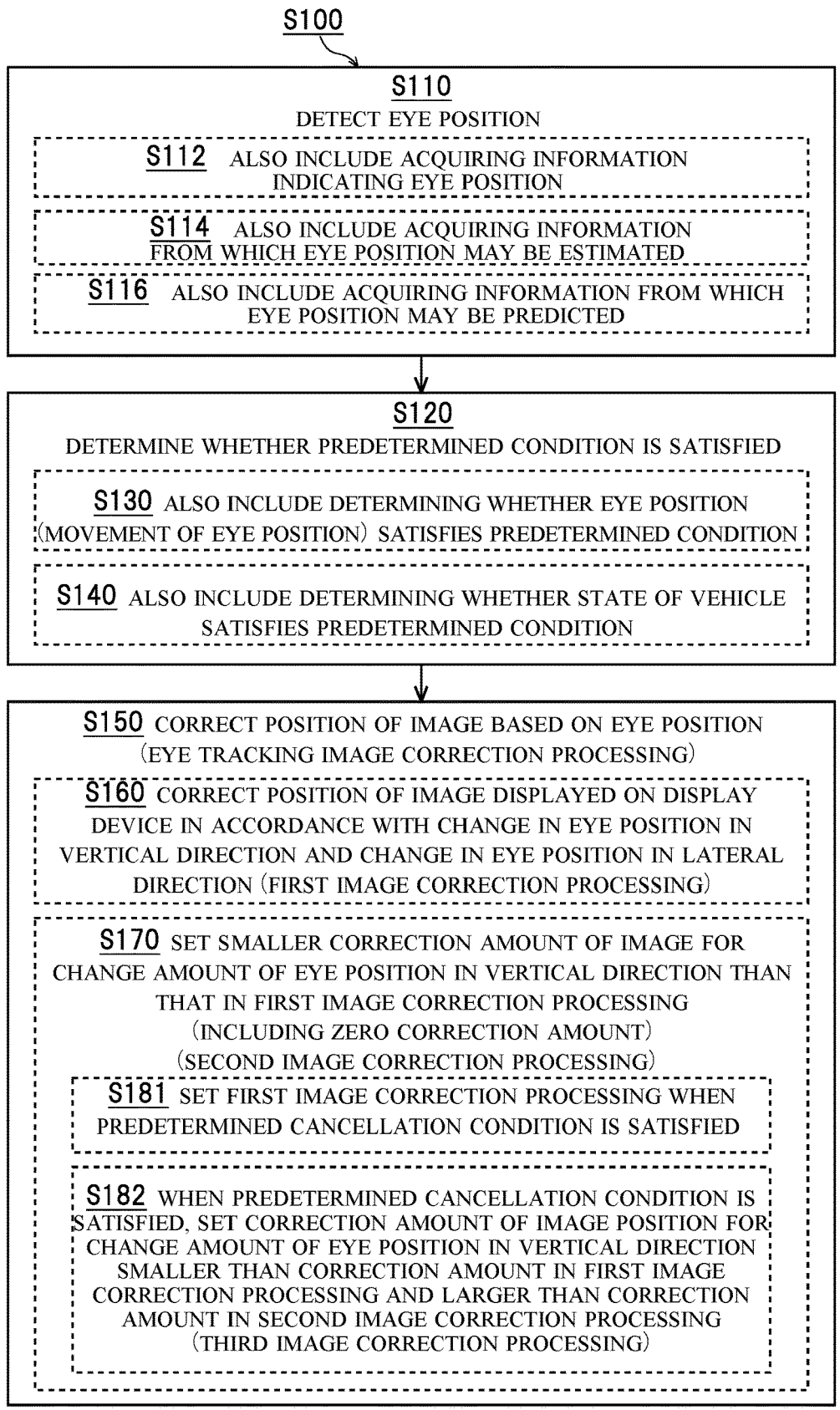

[FIG. 11B]

S130 DETERMINE WHETHER EYE POSITION (MOVEMENT OF EYE POSITION) SATISFIES PREDETERMINED CONDITION

S131 ALSO INCLUDE DETERMINING THAT PREDETERMINED CONDITION IS SATISFIED WHEN EYE POSITION IN LATERAL DIRECTION CONTINUOUSLY CHANGES IN ONE DIRECTION

S132 ALSO INCLUDE DETERMINING THAT PREDETERMINED CONDITION IS SATISFIED WHEN MOVEMENT VELOCITY OF EYE POSITION IN LATERAL DIRECTION IS HIGHER THAN PREDETERMINED FIRST THRESHOLD

S133 ALSO INCLUDE DETERMINING THAT PREDETERMINED CONDITION IS SATISFIED WHEN RATIO OF CHANGE AMOUNT OF EYE POSITION IN VERTICAL DIRECTION TO CHANGE AMOUNT OF EYE POSITION IN LATERAL DIRECTION IS LESS THAN PREDETERMINED SECOND THRESHOLD

S134 ALSO INCLUDE DETERMINING THAT PREDETERMINED CONDITION IS SATISFIED WHEN CHANGE AMOUNT OF EYE POSITION IN VERTICAL DIRECTION IS LESS THAN PREDETERMINED THIRD THRESHOLD

S135 ALSO INCLUDE DETERMINING THAT PREDETERMINED CONDITION IS SATISFIED WHEN EYE POSITION IS IN UNSTABLE STATE

S136 ALSO INCLUDE DETERMINING THAT PREDETERMINED CONDITION IS SATISFIED WHEN DETECTION OPERATION OF EYE POSITION IS IN UNSTABLE STATE

S140 DETERMINE WHETHER STATE OF VEHICLE SATISFIES PREDETERMINED CONDITION

S141 ALSO INCLUDE DETERMINING THAT PREDETERMINED CONDITION IS SATISFIED WHEN VEHICLE IS TRAVELING

S142 ALSO INCLUDE DETERMINING THAT PREDETERMINED CONDITION IS SATISFIED WHEN VEHICLE IS VIBRATING

S143 ALSO INCLUDE DETERMINING THAT PREDETERMINED CONDITION IS SATISFIED WHEN VEHICLE IS IN MANUAL DRIVING MODE

[FIG. 12]

| TIME | EYE POSITION (HEAD POSITION) Py IN VERTICAL DIRECTION | CHANGE AMOUNT ($\Delta Py$) | MOVEMENT VELOCITY ($Vy$) | EYE POSITION (HEAD POSITION) Px IN LATERAL DIRECTION | CHANGE AMOUNT ($\Delta Px$) | MOVEMENT VELOCITY ($Vx$) |
|---|---|---|---|---|---|---|
| t1 | Py1 | | | Px1 | | |
| | | $\Delta Py1$ | Vy1 | | $\Delta Px1$ | Vx1 |
| t2 | Py2 | | | Px2 | | |
| | | $\Delta Py2$ | Vy2 | | $\Delta Px2$ | Vx2 |
| t3 | Py3 | | | Px3 | | |
| | | $\Delta Py3$ | Vy3 | | $\Delta Px3$ | Vx3 |
| t4 | Py4 | | | Px4 | | |
| | | $\Delta Py4$ | Vy4 | | $\Delta Px4$ | Vx4 |
| t5 | Py5 | | | Px5 | | |
| | | $\Delta Py5$ | Vy5 | | $\Delta Px5$ | Vx5 |
| t6 | Py6 | | | Px6 | | |
| | | $\Delta Py6$ | Vy6 | | $\Delta Px6$ | Vx6 |
| t7 | Py7 | | | Px7 | | |
| | | $\Delta Py7$ | Vy7 | | $\Delta Px7$ | Vx7 |
| t8 | Py8 | | | Px8 | | |
| | | $\Delta Py8$ | Vy8 | | $\Delta Px8$ | Vx8 |
| t9 | Py9 | | | Px9 | | |
| | | $\Delta Py9$ | Vy9 | | $\Delta Px9$ | Vx9 |
| t10 | Py10 | | | Px10 | | |

[FIG. 13]
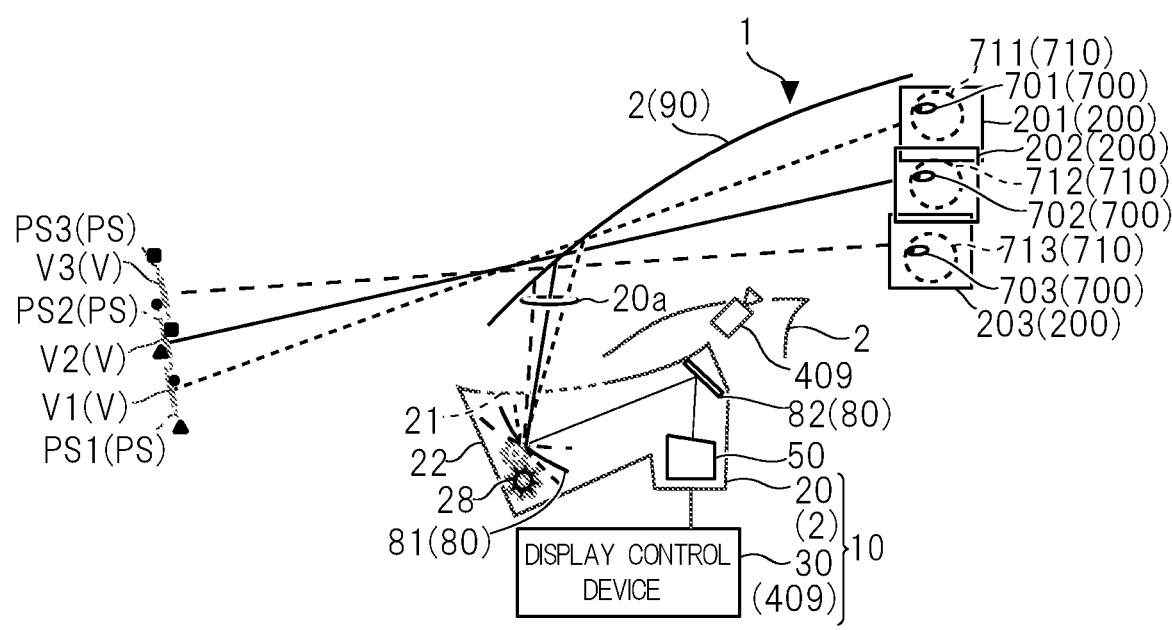

DISPLAY CONTROL DEVICE, HEAD-UP DISPLAY DEVICE, AND DISPLAY CONTROL METHOD

CROSS REFERENCE TO RELATED APPLICATIONS

This application is the U.S. National Phase under 35 U.S.C. § 371 of International Application No. PCT/JP2022/019392, filed on Apr. 28, 2022, which claims the benefit of Japanese Application No. 2021-077871, filed on Apr. 30, 2021, and the entire contents of each are hereby incorporated by reference.

TECHNICAL FIELD

The present disclosure relates to a display control device, a head-up display device, a display control method, and the like, used in a moving object such as a vehicle to cause an image to be superimposed on a foreground of the moving object (an actual scene in a forward direction of the moving object as viewed from an occupant of the vehicle) and visually recognized.

Patent Document 1 describes a head-up display device (an example of a virtual image display device) that reflects display light, which is projected on a projected portion such as a front windshield of a vehicle, toward an occupant (observer) of the vehicle inside the vehicle to cause the observer to visually recognize a virtual image overlapped with a foreground of the vehicle. In particular, the head-up display device described in Patent Document 1 causes a display object (virtual image) to be virtually perceived at a predetermined position (here, the position is referred to as a target position) in the depth direction or the vertical and lateral directions in the real space of the foreground and controls the image displayed inside the head-up display device as if the display object is present at the target position of the foreground even when the posture of the vehicle changes or the eye position of the observer changes. Specifically, the above-described head-up display device forms an augmented reality that additionally displays a virtual object in the real scene (foreground) and, even when the posture of the vehicle changes (which also leads to a change in the eye position of the observer with respect to the actual scene) or the eye position of the observer changes in the vehicle, corrects, for example, the position of the image displayed inside the head-up display device in accordance with the change in the eye position of the observer detected by an eye position detection unit such as a camera to give motion parallax to the virtual object and allow the observer to perceive the virtual object as if the virtual object is present at the target position in the foreground (the actual scene) in a simulated manner.

Furthermore, Patent Document 2 discloses a head-up display device that tracks a right eye position and a left eye position of the observer detected by an eye position detection unit such as a camera and controls a display device to direct the right eye display light indicating a right eye image to the tracked right eye position and direct the left eye display light indicating a left eye image to the tracked left eye position to give binocular parallax to the virtual object and allow the observer to perceive the virtual object as if the virtual object is present at the target position in the foreground (actual scene) in a simulated manner.

Further, Patent Document 3 discloses a head-up display device that adjusts the display position of the image (virtual image) to a position on the straight line when a specific position on the real object present in the foreground (or a position around the real object having a specific positional relationship with the real object) is viewed from the eye position of the observer detected by an eye position detection unit such as a camera to emphasize the position of the real object present in the actual scene.

PRIOR ART DOCUMENT

Patent Document

Patent Document 1: Japanese Laid-open Patent Publication No. 2010-156608
Patent Document 2: Japanese Laid-open Patent Publication No. 2019-062532
Patent Document 3: WO 2019/097918

SUMMARY OF THE INVENTION

Problems to be Solved by the Invention

Furthermore, even when the observer intends to move the eye position in the horizontal direction, such as a motion of moving the head in the lateral direction or a motion of moving the neck in the lateral direction, the observer may also actually move the eye position in the vertical direction, and the eye position detection unit may also detect the movement of the eye position in the vertical direction and thus correct the display position of the image (virtual image) in the vertical direction. In such a case, it is assumed that the image position correction due to the detection of the movement of the eye position in the vertical direction gives a sense of discomfort to the observer who is conscious of moving the eye position in the horizontal direction.

Furthermore, the eye position detection unit such as a camera uses a complicated algorithm for a captured image to detect the eye position (right and left eye positions) of the observer and, even when the eye position of the observer moves only in the lateral direction, the eye position detection unit detects the movement of the eye position in the vertical direction due to a detection error or improper detection depending on the way of moving the head in the lateral direction or moving the neck horizontally and/or the detection environment and thus the display position of the image (virtual image) may also be corrected in the vertical direction. Also in this case, it may be assumed that the image position correction due to the detection of the movement of the eye position in the vertical direction gives a sense of discomfort to the observer who is conscious of moving the eye position only in the horizontal direction.

The summary of certain embodiments disclosed herein is provided below. It should be understood that these aspects are presented merely to provide the reader with the brief summary of these specific embodiments and that these aspects are not intended to limit the scope of the present disclosure. Actually, the present disclosure may include various aspects that are not set forth below.

The summary of the present disclosure relates to making an observer unlikely to feel discomfort. More specifically, the present disclosure relates to providing a display control device, a head-up display device, a display control method, and the like, which suppresses image position correction associated with the detection of movement of the eye position in the vertical direction that is not intended by the user and thus reduces a sense of discomfort given to the user.

Therefore, in order to solve the above-described issue, the display control device, the head-up display device, the display control method, and the like, described herein adopt the following measures. The present embodiment has a summary of switching between first image correction processing S160 to correct the position of the image displayed on the display device based on the eye position in the vertical direction and the eye position in the lateral direction and second image correction processing S170 to correct the position of the image displayed on the display device based on the eye position in the vertical direction and the eye position in the lateral direction, wherein a second correction amount of the position of the image for the change amount of the eye position in the vertical direction is smaller than a first correction amount of the position of the image for the change amount of the eye position in the vertical direction in the first image correction processing S160.

Therefore, a display control device described herein is a display control device that executes display control in a head-up display device that includes at least a display device that displays an image and a relay optical system that projects light of the image displayed by the display device on a projected member and causes a user of a vehicle to visually recognize a virtual image of the image superimposed on a foreground, the display control device includes one or more processors, a memory, and one or more computer programs that are stored in the memory and are executed by the one or more processors, and the processor acquires an eye position of the user in a vertical direction of the vehicle and an eye position in a lateral direction of the vehicle and switches between first image correction processing S160 to correct a position of the image displayed on the display device based on the eye position in the vertical direction and the eye position in the lateral direction and second image correction processing S170 to correct the position of the image displayed on the display device based on the eye position in the vertical direction and the eye position in the lateral direction, wherein a second correction amount of the position of the image for a change amount of the eye position in the vertical direction is smaller than a first correction amount of the position of the image for a change amount of the eye position in the vertical direction during the first image correction processing S160, or correct the position of the image displayed on the display device based on the eye position in the lateral direction, wherein a correction amount of the position of the image for a change amount of the eye position in the vertical direction is zero.

BRIEF DESCRIPTION OF THE DRAWINGS

FIG. 1 is a diagram illustrating an application example of a vehicular virtual image display system to a vehicle.

FIG. 2 is a diagram illustrating a configuration of a head-up display device.

FIG. 3 is a diagram illustrating an example of a foreground visually recognized by an observer and a virtual image displayed to be superimposed on the foreground while an own vehicle is traveling.

FIG. 4 is a diagram conceptually illustrating the positional relationship between a left-viewpoint virtual image and a right-viewpoint virtual image displayed on a virtual image forming surface and a perception image perceived by the observer with the left-viewpoint virtual image and the right-viewpoint virtual image according to an embodiment in which an HUD device is a 3D HUD device.

FIG. 5 is a diagram conceptually illustrating a virtual object disposed at a target position of the actual scene and an image displayed in a virtual image display region so that the virtual object is visually recognized at the target position of the actual scene.

FIG. 6 is a diagram illustrating a method of motion parallax addition processing according to the present embodiment.

FIG. 7A illustrates a comparative example illustrating virtual images visually recognized from a position Px12 illustrated in FIG. 6 in a case where the motion parallax addition processing according to the present embodiment is not performed.

FIG. 7B is a diagram illustrating virtual images visually recognized from the position Px12 illustrated in FIG. 6 in a case where the motion parallax addition processing according to the present embodiment is performed.

FIG. 8 is a diagram illustrating a method of the motion parallax addition processing when the eye position (head position) moves in the vertical direction according to the present embodiment.

FIG. 9 is a diagram illustrating an example of the foreground visually recognized by the observer and the virtual image displayed to be superimposed on the foreground while the own vehicle is traveling.

FIG. 10 is a block diagram of a vehicular virtual image display system according to some embodiments.

FIG. 11A is a flowchart illustrating a method S100 to perform an image correction operation based on the eye position of the observer.

FIG. 11B is a diagram illustrating a part of the flowchart illustrated in FIG. 11A.

FIG. 11C is a diagram illustrating a part of the flowchart illustrated in FIG. 11A.

FIG. 12 is an image diagram illustrating an eye position, a change amount of the eye position, a movement velocity of the eye position, and the like, which are detected in each predetermined periodic time.

FIG. 13 is a diagram illustrating the HUD device according to some embodiments in which a relay optical system is rotated so as to move the eye box in the vertical direction.

MODE FOR CARRYING OUT THE INVENTION

Descriptions of the configuration and operation of an exemplary vehicular display system are provided below in FIGS. 1 to 6 and 7B to 12. Furthermore, the present invention is not limited to the embodiments below (including the contents of the drawings). It is of course possible to make changes (including deletion of components) to the embodiments below. Moreover, in the following descriptions, the descriptions of known technical matters will be omitted as appropriate to facilitate the understanding of the present invention.

Reference is made to FIG. 1. FIG. 1 is a diagram illustrating an example of a configuration of a vehicular virtual image display system including a parallax 3D HUD device. Further, in FIG. 1, the lateral direction of a vehicle (an example of a mobile object) 1 (i.e., the width direction of the vehicle 1) is an X-axis (the positive direction of the X-axis is the left direction when facing the front of the vehicle 1), the vertical direction (i.e., the height direction of the vehicle 1) that is perpendicular to the lateral direction and extends along the line segment perpendicular to the ground or a surface (here, a road surface 6) corresponding to the ground is a Y-axis (the positive direction of the Y-axis is an upward direction), and the front-back direction along the line segment perpendicular to both the lateral direction and the vertical direction is a Z-axis (the positive direction of the Z-axis is a direction in which the vehicle 1 moves straight). This also applies to the other drawings.

As illustrated, a vehicular display system 10 included in the vehicle (own vehicle) 1 includes an eye position detection unit 409 for pupil (or face) detection to detect the positions and the directions of lines of sight of a left eye 700L and a right eye 700R of an observer (typically, a driver seated in the driver's seat of the vehicle 1), a vehicle exterior sensor 411 including a camera (e.g., stereo camera) and the like to capture images in front of (in a broad sense, around) the vehicle 1, a head-up display device (hereinafter also referred to as HUD device) 20, and a display control device 30 that controls the HUD device 20.

FIG. 2 is a diagram illustrating an aspect of a configuration of the head-up display device. The HUD device 20 is installed in, for example, a dashboard (the reference numeral 5 in FIG. 1). The HUD device 20 includes a stereoscopic display device (an example of a display device) 40, a relay optical system 80, and a housing 22 that houses the stereoscopic display device 40 and the relay optical system 80 and includes a light emission window 21 that allows display light K from the stereoscopic display device 40 to be emitted from inside to outside.

Here, the stereoscopic display device 40 is a parallax 3D display device. The stereoscopic display device (parallax 3D display device) 40 includes a light modulation device 50, which is a glasses-free stereoscopic display device using a multi-viewpoint image display method capable of controlling depth representation by causing a left-viewpoint image and a right-viewpoint image to be visually recognized, and a light source unit 60 functioning as a backlight.

The light modulation device 50 includes a light modulation device 51 that modulates illumination light from the light source unit 60 to generate an image and an optical layer (an example of a light beam separation unit) 52 that includes, for example, a lenticular lens, a parallax barrier (disparity barrier) and separates the light emitted from the light modulation device 51 into left-eye display light (the reference numeral K10 in FIG. 1) such as left-eye light beams K11, K12, and K13 and right-eye display light (the reference numeral K20 in FIG. 1) such as right-eye light beams K21, K22, and K23. The optical layer 52 includes an optical filter such as a lenticular lens, a parallax barrier, a lens array, or a microlens array. However, this is merely an example and is not a limitation. The embodiment of the optical layer 52 is not limited to the above-described optical filter and includes all forms of optical layers provided on the front surface or the back surface of the light modulation device 51 as long as the optical layer generates the left-eye display light (the reference numeral K10 in FIG. 1) and the right-eye display light (the reference numeral K20 in FIG. 1) from the light emitted from the light modulation device 51. In some embodiments, the optical layer 52 may be electrically controlled to generate the left-eye display light (the reference numeral K10 in FIG. 1) and the right-eye display light (the reference numeral K20 in FIG. 1) from the light emitted from the light modulation device 51 and may include, for example, a liquid crystal lens. That is, the embodiments of the optical layer 52 may include the ones that are electrically controlled and the ones that are not electrically controlled.

Further, the stereoscopic display device 40 may include a directional backlight unit (an example of a light beam separation unit) as the light source unit 60 instead of or in addition to the optical layer (an example of a light beam separation unit) 52 so as to emit the left-eye display light (the reference numeral K10 in FIG. 1) such as the left-eye light beams K11, K12, and K13 and the right-eye display light (the reference numeral K20 in FIG. 1) such as the right-eye light beams K21, K22, and K23. Specifically, when the directional backlight unit emits the illumination light toward the left eye 700L, for example, the display control device 30 described below causes the light modulation device 51 to display the left-viewpoint image so that the left-eye display light K10 such as the left-eye light beams K11, K12, and K13 is directed toward the left eye 700L of the observer and, when the directional backlight unit emits the illumination light toward the right eye 700R, causes the light modulation device 51 to display the right-viewpoint image so that the right-eye display light K20 such as the right-eye light beams K21, K22, and K23 is directed toward the left eye 700R of the observer. However, this is merely an example and is not a limitation.

The display control device 30 described below executes, for example, image rendering processing (graphic processing) and display device driving processing to direct the left-eye display light K10 of a left-viewpoint image V10 to the left eye 700L of the observer and the right-eye display light K20 of a right-viewpoint image V20 to the right eye 700R and adjusts the left-viewpoint image V10 and the right-viewpoint image V20 to control the mode of a perception virtual image FU displayed by the HUD device 20 (perceived by the observer). Further, the display control device 30 described below may control the display (the light modulation device 50) so as to generate a light field that (substantially) reproduces the light beams output in various directions from a point, or the like, present in a certain space without change.

The relay optical system 80 includes curved mirrors (concave mirrors, etc.) 81, 82 that reflect the light from the stereoscopic display device 40 and project the display lights K10, K20 of the image onto a windshield (projected member) 2. Furthermore, other optical members (which may include a refractive optical member such as a lens, a diffractive optical member such as a hologram, a reflective optical member, or a combination thereof) may be further included.

In FIG. 1, the stereoscopic display device 40 of the HUD device 20 displays images (parallax images) having disparity for the right and left eyes. As illustrated in FIG. 1, the respective parallax images are displayed as V10, V20 formed on a virtual image display surface (virtual image forming surface) VS. The focus of each eye of the observer (person) is adjusted so as to match the position of the virtual image display region VS. Furthermore, the position of the virtual image display region VS is referred to as "adjustment position (or imaging position)", and the distance (see the reference numeral D10 in FIG. 4) from a predetermined reference position (e.g., a center 205 of an eye box 200 of the HUD device 20, the viewpoint position of the observer, or a specific position of the own vehicle 1) to the virtual image display region VS is referred to as adjustment distance (imaging distance).

However, as the brain of the person actually fuses each image (virtual image), the person recognizes that a perception image (here, the graphic of the arrow head for navigation) FU is displayed at a position (e.g., the position that is determined by the convergence angle between the left-viewpoint image V10 and the right-viewpoint image V20 and that is perceived to be at a position further away from the observer as the convergence angle decreases) further on the back side than the adjustment position. Further, the perception virtual image FU may be referred to as "stereoscopic virtual image" and may also be referred to as "stereoscopic image" when the "image" includes a virtual image in a broad sense. Further, it may be referred to as "stereoscopic imagery", "3D display", or the like. Moreover, the HUD device 20 may display the left-viewpoint image V10 and the right-viewpoint image V20 so that the perception image FU is visually recognized at a position further on the front side than the adjustment position.

Next, reference is made to FIGS. 3 and 4. FIG. 3 is a diagram illustrating an example of the foreground visually recognized by the observer and the perception image displayed to be superimposed on the foreground while the own vehicle 1 is traveling. FIG. 4 is a diagram conceptually illustrating the positional relationship between the left-viewpoint virtual image and the right-viewpoint virtual image displayed on the virtual image forming surface and the perception image perceived by the observer with the left-viewpoint virtual image and the right-viewpoint virtual image.

In FIG. 3, the vehicle 1 is traveling on the straight road (road surface) 6. The HUD device 20 is installed in the dashboard 5. The display light K (K10, K20) is projected from the light emission window 21 of the HUD device 20 onto a projected portion (the front windshield of the vehicle 1) 2. In the example of FIG. 3, a first content image FU1, which is superimposed on the road surface 6 and indicates a route (here indicating straight traveling) of the vehicle 1, and a second content image FU2, which also indicates the route (here indicating straight traveling) of the vehicle 1 and is perceived in a longer distance than the first content image FU1, are displayed.

As illustrated in the left section of FIG. 4, the HUD device 20 (1) emits the left-eye display light K10 to the projected portion 2 at the position and the angle at which the left-eye display light K10 is reflected by the projected portion 2 to the left eye 700L detected by the eye position detection unit 409 and forms a first left-viewpoint content image V11 at a predetermined position of the virtual image display region VS viewed from the left eye 700L and (2) emits the right-eye display light K20 to the projected portion 2 at the position and the angle at which the right-eye display light K20 is reflected by the projected portion 2 to the right eye 700R and forms a first right-viewpoint content image V21 at a predetermined position of the virtual image display region VS viewed from the right eye 700R. The first content image FU1, which is perceived by the first left-viewpoint content image V11 and the first right-viewpoint content image V21 having disparity, is visually recognized at a position (the position away from the above-described reference position by a distance D31) that is further on the back side than the virtual image display region VS by a distance D21.

Similarly, as illustrated in the right section of FIG. 4, the HUD device 20 (1) emits the left-eye display light K10 to the projected portion 2 at the position and the angle at which the left-eye display light K10 is reflected by the projected portion 2 to the left eye 700L detected by the eye position detection unit 409 and forms a second left-viewpoint content image V12 at a predetermined position of the virtual image display region VS viewed from the left eye 700L and (2) emits the right-eye display light K20 to the projected portion 2 at the position and the angle at which the right-eye display light K20 is reflected by the projected portion 2 to the right eye 700R and forms a second right-viewpoint content image V22 at a predetermined position of the virtual image display region VS viewed from the right eye 700R. The second content image FU2, which is perceived by the second left-viewpoint content image V12 and the second right-viewpoint content image V22 having disparity, is visually recognized at a position (the position away from the above-described reference position by the distance D31) that is further on the back side than the virtual image display region VS by a distance D22.

Specifically, the distance (an imaging distance D10) from the above-described reference position to the virtual image display region VS is set to for example the distance "4 m", the distance (a first perception distance D31) from the above-described reference position to the first content image FU1 illustrated in the left section of FIG. 4 is set to for example the distance "7 m", and the distance (a second perception distance D32) from the above-described reference position to the second content image FU2 illustrated in the right section of FIG. 4 is set to for example the distance "10 m". However, this is merely an example and is not a limitation.

FIG. 5 is a diagram conceptually illustrating a virtual object disposed at a target position of the actual scene and an image displayed in the virtual image display region so that the virtual object is visually recognized at the target position of the actual scene. Furthermore, in the illustrated example, the HUD device 20 illustrated in FIG. 5 performs 2D display instead of 3D display. That is, the display device 40 of the HUD device 20 illustrated in FIG. 5 is a 2D display device that is not a stereoscopic display device (it should be noted that 2D display is also possible with a stereoscopic display device). As illustrated in FIG. 5, when viewed from a viewer 700, the depth direction is the Z-axis direction, the lateral direction (the width direction of the own vehicle 1) is the X-axis direction, and the vertical direction (the vertical direction of the own vehicle 1) is the Y-axis direction. Furthermore, the direction away from the viewer is the positive direction of the Z-axis, the left direction when viewed from the viewer is the positive direction of the X-axis, and the upward direction when viewed from the viewer is the positive direction of the Y-axis.

The viewer 700 visually recognizes a virtual image V formed (imaged) in the virtual image display region VS via the projected portion 2 to perceive a virtual object FU at a predetermined target position PT in the actual scene. The viewer visually recognizes the virtual image V of the image of the display light K reflected by the projected portion 2. Here, in a case where the virtual image V is, for example, the arrow indicating a course, the arrow of the virtual image V is displayed in the virtual image display region VS such that the virtual object FU is disposed and visually recognized at the predetermined target position PT in the foreground of the own vehicle 1. Specifically, the HUD device 20 (the display control device 30) uses the center between the left eye 700L and the right eye 700R of the observer as the origin of projective transformation and renders the image to be displayed on the display device 40 such that the virtual image V of a predetermined size and shape is displayed, which is obtained by projective transformation of the virtual object FU of a predetermined size and shape disposed at the target position PT onto the virtual image display region VS. Furthermore, even when the observer moves the eye position, the HUD device 20 (the display control device 30) changes the position of the virtual image V displayed in the virtual image display region VS such that the virtual object FU is perceived at the same target position PT as that before the eye position is moved, and thus the virtual object FU (the virtual image V) may be recognized to be at the target position PT although it is displayed at a position (the virtual image display region VS) away from the target position PT. That is, the HUD device 20 (the display control device 30) changes the position (may additionally change the size and shape) of the image (the virtual image V in the virtual image display region VS) on the display device 40 based on the movement of the eye position to express natural motion parallax (in other words, the HUD device 20 adds motion parallax to the virtual image (image) by image correction accompanied with the movement of the eye position to easily feel depth perception). In the description of the present embodiment, the correction of the image position to express motion parallax in accordance with changes in the eye position described above is referred to as motion parallax addition processing (an example of eye tracking image correction processing). The motion parallax addition processing is not limited only to the image position correction to completely reproduce natural motion parallax, but may also include the image position correction to approach natural motion parallax. Furthermore, the HUD device 20 (the display control device 30) may execute not only the motion parallax addition processing (an example of the eye tracking image correction processing) in accordance with changes in the eye position 700 but also motion parallax addition processing (an example of the eye tracking image correction processing) based on a head position 710 of the observer instead of the eye position 700.

FIG. 6 is a diagram illustrating a method of the motion parallax addition processing according to the present embodiment. The display control device 30 (a processor 33) according to the present embodiment controls the HUD device 20 to display virtual images V41, V42, and V43 formed (imaged) in the virtual image display region VS via the projected portion 2. The virtual image V41 is set at a target position PT11 that is a perception distance D33 (a position further on the back side than the virtual image display region VS by a distance D23), the virtual image V42 is set at a target position PT12 that is a perception distance D34 longer than the perception distance D33 of the virtual image V41 (a position further on the back side than the virtual image display region VS by a distance D24 (>D23)), and the virtual image V43 is set at a target position PT13 that is a perception distance D35 longer than the perception distance D34 of the virtual image V42 (a position further on the back side than the virtual image display region VS by a distance D25 (>D24)). Furthermore, as the correction amount of the image in the display device 40 corresponds to the correction amount of the virtual image in the virtual image display region VS, the same reference numerals C1, C2, and C3 are used for the correction amounts of the virtual image corresponding to the correction amounts C1, C2, and C3 of the image in the display device 40 in FIG. 6 (the same applies to the reference numerals Cy11 (Cy), Cy21 (Cy) in FIG. 8).

When the head position 710 (the eye position 700) of the observer moves from the position of the reference numeral Px11 to the right (the negative direction of the X-axis) by ΔPx10, the display control device 30 (the processor 33) executes the motion parallax addition processing to correct the display positions of the virtual images V41, V42, V43 displayed in the virtual image display region VS in the same direction as that of the movement of the head position 710 portion (the eye position 700) of the observer by the correction amounts C1, C2 (>C1), C3 (>C2). FIG. 7A illustrates a comparative example illustrating the virtual images V41, V42, V43 visually recognized from a position Px12 illustrated in FIG. 6 in a case where the motion parallax addition processing according to the present embodiment is not performed, and FIG. 7B is a diagram illustrating the virtual images V44, V45, V46 visually recognized from the position Px12 illustrated in FIG. 6 in a case where the motion parallax addition processing according to the present embodiment is performed. It should be noted that, in FIG. 7B, the difference among the positions of the virtual images V44, V45, V46 is exaggerated so that the difference between the correction amounts may be easily understood. Specifically, the display control device 30 (the processor 33) makes the correction amounts of the positions of the virtual images V41, V42, V43 according to the movement of the eye position different from each other due to the difference in the perception distances D33, D34, D35 of the virtual images V41, V42, V43 so that the observer may feel the motion parallax even among the virtual images V41 (V44), V42 (V45), and V43 (V46). More specifically, as a set perception distance D30 is longer, the display control device 30 (the processor 33) increases the correction amount in the motion parallax addition processing to add the motion parallax to the virtual images V41 (V44), V42 (V45), V43 (V46).

FIG. 8 is a diagram illustrating a method of the motion parallax addition processing when the eye position (head position) moves in the vertical direction according to the present embodiment. When the head position 710 (the eye position 700) of the observer moves upward (in the positive direction of the Y-axis) from the position of the reference numeral Py12, the display control device 30 (the processor 33) executes the motion parallax addition processing to correct the display position of the virtual image V displayed in the virtual image display region VS by the correction amount Cy11 (changes the position of the virtual image V from the position of the reference numeral V48 to the reference numeral V47) in the same direction (upward (the positive direction of the Y-axis)) as that in which the head position 710 (the eye position 700) of the observer has moved, as illustrated in FIG. 8 (a). Furthermore, when the head position 710 (the eye position 700) of the observer moves downward (the negative direction of the Y-axis) from the position of the reference numeral Py12, the display control device 30 (the processor 33) executes the motion parallax addition processing to correct the display position of the virtual image V displayed in the virtual image display region VS by the correction amount Cy21 (changes the position of the virtual image V from the position of the reference numeral V48 to the reference numeral V49) in the same direction (upward (the negative direction of the Y-axis)) as that in which the head position 710 (the eye position 700) of the observer has moved, as illustrated in FIG. 8 (c). Thus, although the virtual object FU (the virtual image V) is displayed at a position (the virtual image display region VS) away from the target position PT, the virtual object FU may be recognized as if the virtual object FU is located at the target position PT (it is possible to enhance the feeling as if the virtual object FU (the virtual image V) is located at the target position PT).

FIG. 9 is a diagram illustrating a real object 300 present in the foreground and the virtual image V displayed by the HUD device 20 according to the present embodiment, which are visually recognized when the observer faces forward from the driver's seat of the vehicle 1. The virtual image V illustrated in FIG. 9 includes an AR virtual image V60 whose display position may be changed in accordance with the position of the real object 300 and a non-AR virtual image V70 whose display position is set regardless of the position of the real object 300. The AR virtual image V60 is displayed at the position (the target position PT) corresponding to the position of the real object 300 present in the actual scene. The AR virtual image V60 is displayed, for example, at a position superimposed on the real object 300 or in the vicinity of the real object 300 to notify the presence of the real object 300 in an emphasized manner. Specifically, the "position (the target position PT) corresponding to the position of the real object 300" is not limited to the position visually recognized to be superimposed on the real object 300 when viewed from the observer and may be a position in the vicinity of the real object 300. Further, the AR virtual image V60 is optional as long as the AR virtual image V60 has a mode that does not hinder the visual recognition of the real object 300.

The AR virtual image V60 illustrated in FIG. 9 includes navigation virtual images V61, V62 indicating guidance routes, emphasized virtual images V64, V65 notifying warning targets in an emphasized manner, a POI virtual image 65 indicating a target object or a predetermined building, etc. The position (the target position PT) corresponding to the position of the real object 300 is the position of a road surface 311 (an example of the real object 300) on which the navigation virtual images V61, V62 are superimposed in the navigation virtual images V61, V62, is a position around a person 313 (an example of the real object 300) in the emphasized virtual image V63, is a position in the vicinity of another vehicle 314 (an example of the real object 300) in the emphasized virtual image V64, and is a position around a building 315 (an example of the real object 300) in the POI virtual image V65. As described above, the display control device 30 (the processor 33) increases the correction amount C accompanied with the movement of the eye position of the observer in the motion parallax addition processing as the perception distance D30 set in the virtual image V is longer. Specifically, when it is assumed that the order of the perception distances D30 set in the virtual image V illustrated in FIG. 9 is V65→V64→V63→V62→V61 in descending order, the display control device 30 (the processor 33) sets the correction amounts C accompanied with the movement of the eye position of the observer such that the correction amount of V65>the correction amount of V64>the correction amount of V63 >the correction amount of V62>the correction amount of V61. Furthermore, as the virtual image V62 and the virtual image V61 are virtual images of the same type and are displayed close to each other, the display control device 30 (the processor 33) may set the same correction amount for V62 and V61 accompanied with the movement of the eye position of the observer.

Furthermore, the display control device 30 (the processor 33) according to some embodiments may set the correction amount C accompanied with the movement of the eye position of the observer to zero in the non-AR virtual image V70 (no correction may be performed in accordance with the movement of the eye position of the observer).

Furthermore, the display control device 30 (the processor 33) according to some embodiments may perform correction in the non-AR virtual image V70 in accordance with the movement of the eye position of the observer. In the example illustrated in FIG. 9, the non-AR virtual image V70 (V71, V72) is located in a lower portion of the virtual image display region VS, and the region of the road surface 311, which is the real object 300 overlapped with them, is closer to the vehicle 1 than the region of the road surface 311 overlapped with the navigation virtual image V61 in FIG. 9. Specifically, the display control device 30 (the processor 33) according to some embodiments may set the perception distance D30 of the non-AR virtual image V70 (V71, V72) to be shorter than the perception distance D30 of the AR virtual image V60 (in a narrow sense, the navigation virtual image V61 that is located in the lowest position among the AR virtual images V60) so that the correction amount C of the non-AR virtual image V70 accompanied with the movement of the eye position of the observer is set to be smaller than the correction amount C of the AR virtual image V60 accompanied with the movement of the eye position of the observer (in a narrow sense, the navigation virtual image V61 that is located in the lowest position among the AR virtual images V60).

FIG. 10 is a block diagram of a vehicular virtual image display system according to some embodiments. The display control device 30 includes one or more I/O interfaces 31, one or more processors 33, one or more image processing circuits 35, and one or more memories 37. The various functional blocks illustrated in FIG. 3 may be configured by hardware, software, or a combination of both. FIG. 10 merely illustrates one embodiment, and the illustrated components may be combined into a fewer components or may be provided with additional components. For example, the image processing circuit 35 (e.g., graphics processing unit) may be included in the one or more processors 33.

As illustrated, the processor 33 and the image processing circuit 35 are operably connected to the memory 37. More specifically, the processor 33 and the image processing circuit 35 execute a program stored in the memory 37 so as to control the vehicular display system 10 (the display device 40), for example, generate and/or transmit image data. The processor 33 and/or the image processing circuit 35 may include at least one general-purpose microprocessor (e.g., central processing unit (CPU)), at least one application-specific integrated circuit (ASIC), at least one field programmable gate array (FPGA), or any combination thereof. The memory 37 includes any type of magnetic medium such as hard disk, any type of optical medium such as CD and DVD, any type of semiconductor memory such as volatile memory, and a non-volatile memory. The volatile memory may include a DRAM and an SRAM, and the non-volatile memory may include a ROM and a NVRAM.

As illustrated, the processor 33 is operably connected to the I/O interface 31. The I/O interface 31 performs a communication (also referred to as CAN communication) with, for example, a vehicular ECU 401, described below, provided in the vehicle and/or other electronic devices (the reference numerals 403 to 419 described below) in accordance with a controller area network (CAN) standard. Furthermore, the communication standard adopted by the I/O interface 31 is not limited to CAN and includes a wired communication interface such as CANFD (CAN with Flexible Data Rate), LIN (Local Interconnect Network), Ethernet (registered trademark), MOST (Media Oriented Systems Transport: MOST is a registered trademark), UART, or USB, or an in-vehicle communication (internal communication) interface that is a short-range wireless communication interface within several tens of meters, such as a personal area network (PAN) such as Bluetooth (registered trademark) network, a local area network (LAN) such as 802.11x Wi-Fi (registered trademark) network. Moreover, the I/O interface 31 may include a vehicle exterior communication (external communication) interface such as a wide-area communication network (e.g., Internet communication network) according to a cellar communication standard, such as wireless wide area network (WWANO, IEEE802.16-2004 (WiMAX: Worldwide Interoperability for Microwave Access)), IEEE802.16e Base (Mobile WiMAX), 4G, 4G-LTE, LTE Advanced, and 5G.

As illustrated, the processor 33 is connected to the I/O interface 31 so as to be mutually operable and thus may transmit and receive information to and from various other electronic devices, and the like, connected to the vehicular display system 10 (the I/O interface 31). The I/O interface 31 is operatively connected to, for example, the vehicular ECU 401, the road information database 403, the own-vehicle position detection unit 405, the operation detection unit 407, the eye position detection unit 409, the vehicle exterior sensor 411, the brightness detection unit 413, the IMU 415, the portable information terminal 417, the external communication device 419, and the like. Furthermore, the I/O interface 31 may include a function to process (convert, calculate, and analyze) information received from another electronic device, or the like, connected to the vehicular display system 10.

The display device 40 is operably connected to the processor 33 and the image processing circuit 35. Therefore, the image displayed by the light modulation device 51 may be based on the image data received from the processor 33 and/or the image processing circuit 35. The processor 33 and the image processing circuit 35 control the image displayed by the light modulation device 51 based on the information acquired from the I/O interface 31.

The vehicular ECU 401 acquires, from a sensor or a switch provided in the own vehicle 1, the state of the own vehicle 1 (for example, the ON/OFF state (an example of activation information) of an activation switch (e.g., an accessory switch: ACC and an ignition switch: IGN), traveling distance, vehicle speed, accelerator pedal opening degree, brake pedal opening degree, engine throttle opening degree, injector fuel injection amount, engine rotation speed, motor rotation speed, steering angle, shift position, drive mode, various warning states, attitude (including roll angle and/or pitch angle), and vibration (including magnitude, repetition, and/or frequency of vibration), etc. and collects and manages (may also control) the state of the own vehicle 1 and, as a part of the functions, may output the signal indicating the numeric value (e.g., the vehicle speed of the own vehicle 1) of the state of the own vehicle 1 to the processor 33 of the display control device 30. Furthermore, in addition to or instead of simply transmitting the numerical value (e.g., a pitch angle of 3 [degrees] in a forward tilting direction) detected by a sensor, or the like, to the processor 33, the vehicular ECU 401 may transmit, to the processor 33, a determination result based on one or more states of the own vehicle 1 including the numerical value detected by the sensor (for example, the fact that the own vehicle 1 satisfies a predetermined condition of a forward tilting state) and/or an analysis result (for example, the fact that the vehicle has entered a forward tilting state by the brake in combination with the information on the brake pedal opening degree). For example, the vehicular ECU 401 may output, to the display control device 30, the signal indicating the determination result such that the own vehicle 1 satisfies a predetermined condition previously stored in a memory (not illustrated) of the vehicular ECU 401. Furthermore, the I/O interface 31 may acquire the above-described information from a sensor or a switch provided in the own vehicle 1 without using the vehicular ECU 401.

Further, the vehicular ECU 401 may output, to the display control device 30, the instruction signal for instructing the image to be displayed by the vehicular display system 10 and, in this case, may transmit the coordinates of an image, size, type, display mode, notification necessity degree of the image, and/or necessity degree-related information, based on which the notification necessity degree is determined, in addition to the instruction signal.

The road information database 403 is included in a navigation device, not illustrated, provided in the own vehicle 1 or an external server connected to the own vehicle 1 via a vehicle exterior communication interface (the I/O interface 31) and may read and transmit the presence/absence, position (including the distance to the own vehicle 1), direction, shape, type, detailed information, and the like, of the road information where the own vehicle 1 travels (lanes, white lines, stop lines, pedestrian crossings, road widths, number of lanes, intersections, curves, branch roads, traffic regulations, etc.) and feature information (buildings, bridges, rivers, etc.), which are the surrounding information on the own vehicle 1 (the real object related-information in the surroundings of the own vehicle 1) to the processor 33 based on the position of the own vehicle 1 acquired from the own-vehicle position detection unit 405. Furthermore, the road information database 403 may calculate an appropriate route (navigation information) from a departure place to a destination, and output the signal indicating the navigation information or the image data indicating the route to the processor 33.

The own-vehicle position detection unit 405 is a GNSS (global navigation satellite system), or the like, provided in the own vehicle 1 to detect the current position and orientation of the own vehicle 1 and outputs the signal indicating the detection result to the road information database 403, the portable information terminal 417 described below, and/or the external communication device 419 via the processor 33 or directly. The road information database 403, the portable information terminal 417 described below, and/or the external communication device 419 may acquire the position information on the own vehicle 1 from the own-vehicle position detection unit 405 continuously, intermittently, or for each predetermined event to select and generate the information on the surroundings of the own vehicle 1 and output the information to the processor 33.

The operation detection unit 407 is, for example, a hardware switch provided on a CID (Center Information Display), an instrument panel, or the like of the own vehicle 1, a software switch combining an image and a touch sensor, or the like, and outputs operation information based on an operation by an occupant (a user seated in the driver's seat and/or a user seated in the passenger seat) of the own vehicle 1 to the processor 33. For example, the operation detection unit 407 outputs display region setting information based on the operation of moving the virtual image display region 100, eye box setting information based on the operation of moving the eye box 200, information based on the operation of setting the eye position 700 of the observer, and the like, to the processor 33 in accordance with the operation of the user.

The eye position detection unit 409 includes a camera such as an infrared camera that detects the eye position 700 (see FIG. 1) of the observer sitting on the driver's seat of the own vehicle 1 and may output captured images to the processor 33. The processor 33 may acquire a captured image (an example of information from which the eye position 700 may be estimated) from the eye position detection unit 409, analyze the captured image by a method such as pattern matching to detect the coordinates of the eye position 700 of the observer, and output the signal indicating the detected coordinates of the eye position 700 to the processor 33.

Furthermore, the eye position detection unit 409 may output the analysis result obtained by analyzing the captured image of the camera (for example, the signal indicating where the eye position 700 of the observer belongs in the spatial region corresponding to a plurality of preset display parameters) to the processor 33. Furthermore, the method for acquiring the eye position 700 of the observer of the own vehicle 1 or the information from which the eye position 700 of the observer may be estimated is not limited thereto, and it may be acquired using a known eye position detection (estimation) technique.

Furthermore, the eye position detection unit 409 may detect the movement velocity and/or the movement direction of the eye position 700 of the observer and output the signal indicating the movement velocity and/or the movement direction of the eye position 700 of the observer to the processor 33.

Furthermore, when the eye position detection unit 409 detects (10) the signal indicating that the eye position 700 of the observer is outside the eye box 200, (20) the signal from which it is estimated that the eye position 700 of the observer is outside the eye box 200, or (30) the signal from which it is predicted that the eye position 700 of the observer is outside the eye box 200, the eye position detection unit 409 may determine that the predetermined condition is satisfied and output the signal indicating the state to the processor 33.

(20) The signal from which it is estimated that the eye position 700 of the observer is outside the eye box 200 includes (21) the signal indicating that the eye position 700 of the observer is not detectable, (22) the signal indicating that the eye position 700 of the observer is not detectable after the movement of the eye position 700 of the observer is detected, and/or (23) the signal indicating that any one of the eye positions 700R and 700L of the observer is in the vicinity of a boundary 200A of the eye box 200 (the vicinity includes, for example, being within predetermined coordinates from the boundary 200A), etc.

(30) The signal from which it is predicted that the eye position 700 of the observer is outside the eye box 200 includes (31) the signal indicating that the newly detected eye position 700 is equal to or more than an eye position movement distance threshold previously stored in the memory 37 with respect to the previously detected eye position 700 (the movement of the eye position within a predetermined unit time is more than a specified range), (32) the signal indicating that the movement velocity of the eye position is equal to or more than an eye position movement velocity threshold previously stored in the memory 37, etc.

Furthermore, the eye position detection unit 409 may have a function as the line-of-sight direction detection unit 409. The line-of-sight direction detection unit 409 may include an infrared camera or a visible light camera that captures an image of the face of the observer sitting on the driver's seat of the own vehicle 1 to output the captured image to the processor 33. The processor 33 may acquire a captured image (an example of the information from which the direction of the line of sight may be estimated) from the line-of-sight direction detection unit 409 and analyze the captured image to specify the direction of the line of sight (and/or the gaze position) of the observer. Furthermore, the line-of-sight direction detection unit 409 may analyze the captured image from the camera and output the signal indicating the direction of the line of sight (and/or the gaze position) of the observer, which is an analysis result, to the processor 33. Further, the method for acquiring the information from which the direction of the line of sight of the observer of the own vehicle 1 may be estimated is not limited thereto, and the information may be acquired by using other known line-of-sight direction detection (estimation) techniques such as the EOG (Electro-oculogram) method, a corneal reflection method, a scleral reflection method, a Purkinje image detection method, a search coil method, and an infrared fundus camera method.

The vehicle exterior sensor 411 detects a real object present around (front, side, and back) the own vehicle 1. The real object detected by the vehicle exterior sensor 411 may include, for example, an obstacle (e.g., pedestrian, bicycle, motorcycle, or other vehicles), a road surface of a travel lane described below, a marking line, a roadside object, and/or a feature (e.g., building). The vehicle exterior sensor includes, for example, a detection unit including a radar sensor such as a millimeter-wave radar, an ultrasonic radar, or a laser radar, a camera, or a combination thereof, and a processing device that processes detection data (fuses data) from the one or more detection units. For the object detection by the radar sensor or the camera sensor, a conventional well-known method is applied. The object detection using these sensors may include detection of the presence or absence of the real object in a three-dimensional space, and if the real object is present, the position (a relative distance from the own vehicle 1, the position in the lateral direction when the traveling direction of the own vehicle 1 is the front-back direction, the position in the vertical direction, etc.), size (size in the horizontal direction (lateral direction), height direction (vertical direction), etc.), the moving direction (the horizontal direction (lateral direction), depth direction (front-back direction)), the movement velocity (horizontal direction (lateral direction), depth direction (front-back direction)), and/or the type of the real object. The one or more vehicle exterior sensors 411 may detect the real object in front of the own vehicle 1 for each detection cycle of each sensor and output real object information (presence or absence of the real object, and information such as the position, size, and/or type of each real object when the real object is present), which is an example of real object information, to the processor 33. Furthermore, the real object information may be transmitted to the processor 33 via another device (for example, the vehicular ECU 401). Furthermore, when a camera is used as a sensor, an infrared camera or a near-infrared camera is desirable so that the real object may be detected even when the surroundings are dark, such as at night. Further, when a camera is used as a sensor, a stereo camera capable of acquiring a distance, and the like, by parallax is desirable.

The brightness detection unit 413 detects illuminance or luminance of a predetermined range of the foreground existing in front of the vehicle interior of the own vehicle 1 as external brightness (an example of brightness information) or illuminance or luminance of the vehicle interior as in-vehicle brightness (an example of brightness information). The brightness detection unit 413 is, for example, a phototransistor or a photodiode and is mounted on an instrument panel, a room mirror, the HUD device 20, or the like, of the own vehicle 1 illustrated in FIG. 1.

The IMU 415 may include a combination of one or more sensors (e.g., accelerometers and gyroscopes) configured to sense the position, orientation, and changes thereto (change rate, change acceleration) of the own vehicle 1 based on inertial acceleration. The IMU 415 may output, to the processor 33, detected values (the detected values include the signals indicating the position, orientation, and changes thereto (change rate, change acceleration) of the own vehicle 1) and the results of analysis of the detected values. The analysis result is, for example, the signal indicating a determination result as to whether the detected value satisfies a predetermined condition and, for example, may be the signal indicating that the behavior (vibration) of the own vehicle 1 is small from the value related to a change (change rate, change acceleration) in the position or orientation of the own vehicle 1.

The portable information terminal 417 is a smartphone, a notebook computer, a smart watch, or another information device that is portable by the observer (or another occupant of the own vehicle 1). The I/O interface 31 may communicate with the portable information terminal 417 by pairing with the portable information terminal 417 and acquires the data recorded in the portable information terminal 417 (or a server via the portable information terminal). The portable information terminal 417 may have, for example, the same functions as those of the road information database 403 and the own-vehicle position detection unit 405 described above, acquire the road information (an example of real object-related information), and transmit it to the processor 33. Furthermore, the portable information terminal 417 may acquire commercial information (an example of the real object-related information) related to a commercial facility in the vicinity of the own vehicle 1 and transmit it to the processor 33. Moreover, the portable information terminal 417 may transmit schedule information of the owner (for example, the observer) of the portable information terminal 417, incoming call information in the portable information terminal 417, reception information of mails, and the like, to the processor 33, and the processor 33 and the image processing circuit 35 may generate and/or transmit the image data related thereto.

The external communication device 419 is a communication device that exchanges information with the own vehicle 1 and is, for example, other vehicles connected to the own vehicle 1 by vehicle-to-vehicle communication (V2V: Vehicle To Vehicle), pedestrians (portable information terminals carried by pedestrians) connected by vehicle-to-pedestrian communication (V2P: Vehicle To Pedestrian), and network communication devices connected by vehicle-to-roadside infrastructure (V2I: Vehicle To roadside Infrastructure) and, in a broad sense, includes all devices connected by communications (V2X: Vehicle To Everything) with the own vehicle 1. The external communication device 419 may acquire, for example, the positions of a pedestrian, a bicycle, a motorcycle, another vehicle (a preceding vehicle or the like), a road surface, a marking line, a roadside object, and/or a feature (a building or the like) and output them to the processor 33. Furthermore, the external communication device 419 may have the same function as that of the own-vehicle position detection unit 405 described above, acquire the position information on the own vehicle 1, and transmit it to the processor 33 and may further have the function of the road information database 403 described above, acquire the road information (an example of the real object-related information), and transmit it to the processor 33. Further, the information acquired from the external communication device 419 is not limited to the above-described information.

The software components stored in the memory 37 include an eye position detection module 502, an eye position estimation module 504, an eye position prediction module 506, an eye position state determination module 508, a vehicle state determination module 510, an eye tracking image processing module 512, a graphic module 514, a light source driving module 516, an actuator driving module 518, and the like.

FIGS. 11A, 11B, and 11 are flowcharts illustrating a method S100 to perform an image correction operation based on the eye position of the observer. The method S100 is executed by the HUD device 20 including a display and the display control device 30 that controls the HUD device 20. Some operations in the method S100 described below are selectively combined as appropriate, the order of some operations is selectively changed as appropriate, and some operations are selectively omitted as appropriate.

First, the display control device 30 (the processor 33) detects the eye position 700 of the observer (Step S110). (Step S112)

In Step S110 according to some embodiments, the display control device 30 (the processor 33) executes the eye position detection module 502 in FIG. 10 to detect the eye position 700 of the observer (acquires the information indicating the eye position 700) via the eye position detection unit 409. The eye position detection module 502 includes various software components to perform various operations related to the detection of the coordinates indicating the eye position 700 of the observer (the positions in the directions of the X-, Y-axes, an example of the signal indicating the eye position 700), the detection of the coordinates indicating the height of the eye of the observer (the position in the direction of the Y-axis, an example of the signal indicating the eye position 700), the detection of the coordinates indicating the height and the position in the depth direction of the eye of the observer (the positions in the directions of the Y- and Z-axes, an example of the signal indicating the eye position 700), and/or the detection of the coordinates indicating the eye position 700 of the observer (the positions in the directions of X-, Y-, and Z-axes, an example of the signal indicating the eye position 700).

Furthermore, the eye position 700 detected by the eye position detection module 502 may include the positions 700R, 700L of the right and left eyes, a predetermined one of the right eye position 700R and the left eye position 700L, any one of the right eye position 700R and the left eye position 700L that is detectable (may be easily detected), the position calculated from the right eye position 700R and the left eye position 700L (for example, the midpoint between the right eye position and the left eye position), etc. For example, the eye position detection module 502 determines the eye position 700 based on the observation position acquired from the eye position detection unit 409 immediately before the timing of updating the display setting.

Further, the eye position detection unit 409 may detect the movement direction and/or the movement velocity of the eye position 700 of the observer based on a plurality of observation positions with different detection timings of the eye of the observer acquired from the eye position detection unit 409 and output the signal indicating the movement direction and/or the movement velocity of the eye position 700 of the observer to the processor 33.

(Step S114)

Furthermore, in Step S110 according to some embodiments, the display control device 30 (the processor 33) may execute the eye position estimation module 504 to acquire the information from which the eye position may be estimated (Step S114). The information from which the eye position may be estimated is, for example, the captured image acquired from the eye position detection unit 409, the position of the driver's seat in the vehicle 1, the position of the face of the observer, the sitting height, or the observation positions of the eyes of the plurality of observers. The eye position estimation module 504 estimates the eye position 700 of the observer of the vehicle 1 from the information from which the eye position may be estimated. The eye position estimation module 504 includes various software components to execute various operations related to the estimation of the eye position 700 of the observer, such as the estimation of the eye position 700 of the observer from the captured image acquired from the eye position detection unit 409, the position of the driver's seat in the vehicle 1, the position of the face of the observer, the sitting height, the observation positions of the eyes of the plurality of observers, etc. That is, the eye position estimation module 504 may include table data, an arithmetic expression, and the like, to estimate the eye position 700 of the observer from the information from which the eye position may be estimated.
(Step S116)

Furthermore, in Step S110 according to some embodiments, the display control device 30 (the processor 33) may execute the eye position prediction module 506 to acquire the information from which the eye position 700 of the observer may be predicted (Step S116). The information from which the eye position 700 of the observer may be predicted is, for example, the latest observation position acquired from the eye position detection unit 409 or one or more observation positions acquired in the past. The eye position prediction module 506 includes various software components to perform various operations related to the prediction of the eye position 700 based on the information from which the eye position 700 of the observer may be predicted. Specifically, for example, the eye position prediction module 506 predicts the eye position 700 of the observer at the timing at which the observer visually recognizes the image to which the new display setting is applied. The eye position prediction module 506 may use a prediction algorithm such as a method of least squares, a Kalman filter, an a-β filter, or a particle filter and uses one or more observation positions in the past to predict the subsequent value.
(Step S120)

Subsequently, the display control device 30 (the processor 33) determines whether a predetermined condition is satisfied (Step S120).

FIG. 11B is a diagram illustrating an operation of the eye position state determination module 508 in Step S130.
(Step S130)

In Step S120 according to some embodiments, the display control device 30 (the processor 33) executes the eye position state determination module 508 of FIG. 10 to determine whether the eye position 700 (the movement of the eye position 700) satisfies a predetermined condition based on the information indicating the eye position acquired in Step S110, the information from which the eye position may be estimated, or the information from which the eye position may be predicted.

FIG. 12 is a table illustrating (11) an eye position (or may be a head position) Py (Y1, Y2, Y3, . . . . Y10) in the vertical direction, (12) a change amount ΔPy (Py1 (=Y2-Y1), Py2 (=Y3-Y2), Py3 (=Y4-Y3), . . . . Py9 (=Y10-Y9)) of the eye position (or may be the head position) in the vertical direction, (13) a movement velocity Vy (Vy1 (=Py1/Δt), Vy2 (=Py2/Δt), Vy3 (=Py3/Δt), . . . . Vy9 (=Py9/Δt)) of the eye position (or may be the head position) in the vertical direction, (21) an eye position (or may be a head position) Px (X1, X2, X3, . . . . X10) in the vertical direction, (22) a change amount ΔPx (Px1 (=X2-X1), Px2 (=X3-X2), Px3 (=X4-X3), . . . . Px9 (=X10-X9)) of the eye position (or may be the head position) in the vertical direction, (23) a movement velocity Vx (Vx1 (=Px1/Δt), Vx2 (=Px2/Δt), Vx3 (=Px3/Δt), . . . . Vx9 (=Px9/Δt)) of the eye position (or may be the head position) in the vertical direction, which are detected in each predetermined periodic time t (t1, t2, t3, . . . t10).
(Step S131)

In Step S130 according to some embodiments, the display control device 30 (the processor 33) may execute the eye position state determination module 508 of FIG. 10 to determine that the predetermined condition is satisfied when the eye position in the lateral direction continuously changes in one direction. The eye position state determination module 508 may determine that the predetermined condition is satisfied, for example, when it is detected that the change amount ΔPx of the eye position in the lateral direction illustrated in FIG. 12 continuously changed in one direction (here, the right direction) such as Px3 (the right direction) →Px4 (the right direction).
(Step S132)

Furthermore, in Step S130 according to some embodiments, the display control device 30 (the processor 33) may execute the eye position state determination module 508 of FIG. 10 to compare the movement velocity Vy of the eye position in the lateral direction with a predetermined first threshold (not illustrated) previously stored in the memory 37 (or set by the operation detection unit 407) and, when the movement velocity Vy of the eye position in the lateral direction is higher than the predetermined first threshold, determine that the predetermined condition is satisfied.
(Step S133)

Furthermore, in Step 130 according to some embodiments, the display control device 30 (the processor 33) may execute the eye position state determination module 508 of FIG. 10 to, for example, compare the ratio (Px/Py) of the change amount of the eye position in the vertical direction to the change amount of the eye position in the lateral direction with a predetermined second threshold (not illustrated) previously stored in the memory 37 (or set by the operation detection unit 407) and, when the ratio (Px/Py) of the change amount of the eye position in the vertical direction to the change amount of the eye position in the lateral direction is higher than the predetermined first threshold, determine that the predetermined condition is satisfied.
(Step S134)

Furthermore, in Step 130 according to some embodiments, the display control device 30 (the processor 33) may execute the eye position state determination module 508 of FIG. 10 to, for example, compare the change amount ΔPy of the eye position in the vertical direction with a predetermined third threshold (not illustrated) previously stored in the memory 37 (or set by the operation detection unit 407) and, when the movement velocity Vy of the eye position in the lateral direction is higher than the predetermined first threshold, determine that the predetermined condition is satisfied.
(Step S135)

Furthermore, according to some embodiments, the eye position state determination module 508 of FIG. 10 may determine whether the eye position 700 of the observer is in an unstable state and determine that the predetermined condition is satisfied when it is determined that the eye position 700 of the observer is in an unstable state. The eye position state determination module 508 includes various software components to execute various operations related to determining whether the stability of the eye position of the observer is low (unstable) and determining that it is an unstable state when the stability of the eye position of the observer is low (Step S135). That is, the eye position state determination module 508 may include a threshold, table data, an arithmetic expression, and the like, to determine whether the eye position 700 of the observer is in an unstable state from detection information, estimation information, or prediction information on the eye position 700.
(Example of Step S135)

A configuration may be such that the eye position detection module 502 calculates the variance of position data of each of a plurality of observation positions acquired from the eye position detection unit 409 within a predetermined measurement time and the eye position state determination module 508 determines that the stability of the eye position of the observer is low (unstable) when the variance calculated by the eye position detection module 502 is larger than a predetermined threshold previously stored in the memory 37 (or set by the operation detection unit 407).

(Example of Step S135)

A configuration may be such that the eye position detection module 502 calculates the deviation of position data of each of a plurality of observation positions acquired from the eye position detection unit 409 within a predetermined measurement time and the eye position state determination module 508 determines that the stability of the eye position of the observer is low (unstable) (not an unstable state) when the deviation calculated by the eye position detection module 502 is larger than a predetermined threshold previously stored in the memory 37 (or set by the operation detection unit 407).

Furthermore, a configuration may be such that, without using the variance or deviation in Step S135, the eye position detection module 502 may identify the eye box 200 as a plurality of partial viewing regions (for example, 25 regions divided into five in the vertical direction and into five in the lateral direction) and determines that the stability of the eye position of the observer is low (unstable) (not an unstable state) when the number of partial viewing regions in which the eye position 700 has moved per predetermined unit time is larger than a predetermined threshold. Further, a configuration may be such that the eye position detection module 502 determines that the stability of the eye position of the observer is low (unstable) (not an unstable state) when the total movement distance of the eye position 700 per predetermined unit time (the sum of distances between a plurality of observation positions acquired a plurality of times per unit time) is longer than a predetermined threshold.

(Step S136)

Further, according to some embodiments, the eye position state determination module 508 of FIG. 10 determines whether the detection operation of the eye position 700 of the observer is in an unstable state and determines that the predetermined condition is satisfied when it is determined that the detection operation is in an unstable state. The eye position state determination module 508 includes various software components to perform various operations related to (10) determining whether the eye position 700 of the observer is detectable and determining that it is an unstable state when the eye position 700 is not detectable (an example of Step S136), (20) determining whether it may be estimated that the detection accuracy of the eye position 700 of the observer has reduced and determining that it is an unstable state when it may be estimated that the detection accuracy of the eye position 700 has reduced (an example of Step S136), (30) determining whether the eye position 700 of the observer is outside the eye box 200 and determining that it is an unstable state when the eye position 700 is outside the eye box 200 (an example of Step S136), (40) determining whether it may be estimated that the eye position 700 of the observer is outside the eye box 200 and determining that it is an unstable state when it may be estimated that the eye position 700 is outside the eye box 200 (an example of Step S136), and (50) determining whether it is predicted that the eye position 700 of the observer is outside the eye box 200 and determining that it is an unstable state when it is predicted that the eye position 700 is outside the eye box 200 (an example of Step S136). That is, the eye position state determination module 508 may include a threshold, table data, an arithmetic expression, and the like, to determine whether the detection operation of the eye position 700 of the observer is in an unstable state from detection information, estimation information, prediction information, or the like, of the eye position 700.

(Example of Step S136)

The method for determining whether the eye position 700 of the observer is detectable includes (1) acquiring the signal indicating that the eye position 700 is not detectable from the eye position detection unit 409, (2) being unable to detect a part (for example, a predetermined number of times or more) or all of the observation positions of the eyes of the observer acquired from the eye position detection unit 409 within a predetermined period, and (3) being unable to detect the eye position 700 of the observer in a normal operation by the eye position detection module 502 or using a combination thereof to determine that the eye position 700 of the observer is not detectable (the detection of the eye position 700 of the observer is in an unstable state) (the determination method is not limited thereto).

(Example of Step S136)

The method for determining that the detection accuracy of the eye position 700 of the observer has reduced includes (1) acquiring the signal indicating that it is estimated that the training accuracy of the eye position 700 has reduced from the eye position detection unit 409, (2) being unable to detect a part (for example, a predetermined number of times or more) or all of the observation positions of the eyes of the observer acquired from the eye position detection unit 409 within a predetermined period, (3) being unable to detect the eye position 700 of the observer in a normal operation by the eye position detection module 502, (4) being unable to estimate the eye position 700 of the observer in a normal operation by the eye position estimation module 504, and (5) being unable to predict the eye position 700 of the observer in a normal operation by the eye position prediction module 506 or using a combination thereof to determine that the detection accuracy of the eye position 700 of the observer has reduced (the determination method is not limited thereto).

(Example of Step S136)

The method for determining whether the eye position 700 of the observer is outside the eye box 200 includes (1) acquiring, from outside the eye box 200, a part (e.g., a predetermined number of times or more) or all of the observation positions of the eyes of the observer acquired from the eye position detection unit 409 within a predetermined period, (2) detecting, by the eye position detection module 502, the eye position 700 of the observer from outside the eye box 200 or using a combination thereof to determine that the eye position 700 of the observer is outside the eye box 200 (the eye position 700 of the observer is in an unstable state) (the determination method is not limited thereto).

(Example of Step S136)

The method for determining whether it may be estimated that the eye position 700 of the observer is outside the eye box 200 includes (1) being unable to detect the eye position 700 of the observer after the eye position detection unit 409 detects the movement of the eye position 700 of the observer, (2) detecting, by the eye position detection module 502, the eye position 700 of the observer near the boundary of the eye box 200, (3) detecting, by the eye position detection module 502, either the right eye position 700R or the left eye position 700L of the observer near the boundary of the eye box 200, or using a combination thereof to determine that it may be estimated that the eye position 700 of the observer is outside the eye box 200 (the eye position 700 of the observer is in an unstable state) (the determination method is not limited thereto).

(Example of Step S136)

The method for determining whether it is predicted that the eye position 700 of the observer is outside the eye box 200 includes (1) predicting, by the eye position prediction module 506, that the eye position 700 of the observer after a predetermined time is outside the eye box 200, (2) the eye position 700 newly detected by the eye position detection module 502 is equal to or more than the eye position movement distance threshold previously stored in the memory 37 with respect to the previously detected eye position 700 (the movement velocity of the eye position 700 is equal to or more than the eye position movement velocity threshold previously stored in the memory 37), or using a combination thereof to determine that it may be predicted that the eye position 700 of the observer is outside the eye box 200 (the eye position 700 of the observer is in an unstable state) (the determination method is not limited thereto).

FIG. 11C is a diagram illustrating an operation of the vehicle state determination module 510 in Step S140.

(Step S140)

In Step S120 according to some embodiments, the display control device 30 (the processor 33) may execute the vehicle state determination module 510 of FIG. 10 to determine whether the state of the vehicle satisfies a predetermined condition.

(Step S141)

In Step S140 according to some embodiments, the display control device 30 (the processor 33) may execute the vehicle state determination module 510 of FIG. 10 to estimate whether the vehicle 1 is traveling based on information such as traveling distance, vehicle speed, and shift position acquired from the vehicular ECU 401, the information indicating the own vehicle position acquired from the own-vehicle position detection unit 405, and the information acquired from the IMU 415 and, when it is estimated that the vehicle 1 is traveling, determine that the predetermined condition is satisfied.

(Step S142)

In Step S140 according to some embodiments, the display control device 30 (the processor 33) may execute the vehicle state determination module 510 of FIG. 10 to estimate whether the vehicle 1 is vibrating based on, for example, the information about the vehicle vibration (including the magnitude, repetition, and/or frequency of the vibration) acquired from the vehicular ECU 401 and the information acquired from the IMU 415 (more specifically, estimate whether the vehicle 1 is traveling on a rough road based on, for example, an increase in the repetition and/or a high amplitude) and, when it is estimated that the vehicle 1 is vibrating, determine that the predetermined condition is satisfied.

(Step S143)

In Step S140 according to some embodiments, the display control device 30 (the processor 33) may execute the vehicle state determination module 510 of FIG. 10 to determine whether the vehicle 1 is in a manual driving mode based on, for example, the information about the driving mode (an automatic driving mode or a manual driving mode) acquired from the vehicular ECU 401 and, when the vehicle is in the manual driving mode, determine that the predetermined condition is satisfied.

(Step S150)

Reference is again made to FIG. 11A. After it is determined in Step S120 whether the predetermined condition is satisfied, the display control device 30 (the processor 33) executes the eye tracking image processing module 512 to correct the position of the image to be displayed on the display device 40 based on the eye position 700 of the observer (specifically, the eye position 700 is the eye position Py in the vertical direction and the eye position Px in the lateral direction in FIG. 12 and, in addition, may be the eye position in the front-back direction) (eye tracking image processing).

The eye tracking image processing module 512 of FIG. 10 switches between first image correction processing S160 (Step S160) and second image correction processing S170 (Step S170) based on a determination result in Step S120.

(First Image Correction Processing S160)

When it is determined in Step S120 that the predetermined condition is not satisfied, the eye tracking image processing module 512 of FIG. 10 corrects the position of the virtual image V in the vertical direction by a first correction amount Cy1 corresponding to the change amount ΔPy of the eye position in the vertical direction and corrects the position of the virtual image V in the lateral direction in accordance with the change amount ΔPx of the eye position in the lateral direction. The first correction amount Cy1 (the same applies to a second correction amount Cy2 described below) is a parameter that gradually increases as the change amount ΔPy of the eye position in the vertical direction increases. Furthermore, the first correction amount Cy1 (the same applies to the second correction amount Cy2 described below) is a parameter that gradually increases as the perception distance D30 set in the virtual image V increases. The first image correction processing S160 includes image position correction to completely reproduce natural motion parallax as if the virtual image V is fixed at the set target position PT when viewed from the eye position Py in the vertical direction and, in a broad sense, may also include image position correction to approach natural motion parallax. That is, in the first image correction processing S160, the display position of the virtual image V is adjusted to the position of the intersection between the virtual image display region VS and the straight line connecting the target position PT set in the virtual image V and the eye position 700 of the observer (the display position of the virtual image V is brought closer).

(Example of Second Image Correction Processing S170 S170)

When it is determined in Step S120 that the predetermined condition is satisfied, the eye tracking image processing module 512 of FIG. 10 corrects the position of the virtual image V in the vertical direction by the second correction amount Cy2 corresponding to the change amount ΔPy of the eye position in the vertical direction and corrects the position of the virtual image V in the lateral direction in accordance with the change amount ΔPx of the eye position in the lateral direction. The second correction amount Cy2 is smaller than the first correction amount Cy1 for the change amount ΔPy of the eye position in the vertical direction in the first image correction processing S160. Specifically, when the first correction amount Cy1 for the change amount ΔPy of the eye position in the vertical direction is 100%, for example, the second correction amount Cy2 for the same change amount ΔPy of the eye position in the vertical direction is lower than 25%. Furthermore, in a broad sense, the second correction amount Cy2 may be smaller than the first correction amount Cy1, and therefore the second correction amount Cy2 may be less than 100% with respect to the first correction amount Cy1, but is preferably less than 60% with respect to the first correction amount Cy1.
(Example of Second Image Correction Processing S170 S170)

Furthermore, when it is determined that the predetermined condition is satisfied in S120, the eye tracking image processing module 512 of FIG. 10 according to some embodiments may set the second correction amount Cy2 corresponding to the change amount ΔPy of the eye position in the vertical direction to zero. In this case, the eye position tracking image processing module 511 corrects the position of the virtual image V in the lateral direction only in accordance with the change amount ΔPx (the eye position Py in the lateral direction) of the eye position in the lateral direction.
(Example of Second Image Correction Processing S170 S170)

Furthermore, the correction amount Cx2 of the image position for the change amount ΔPx of the eye position in the lateral direction in the second image correction processing S170 S170 is equal to the correction amount Cx1 of the image position for the change amount ΔPx of the eye position in the lateral direction in the first image correction processing S160. However, this is not a limitation, and the correction amount Cx2 of the image position for the change amount ΔPx of the eye position in the lateral direction in the second image correction processing S170 S170 may be set to be lower than the correction amount Cx1 of the image position for the change amount ΔPx of the eye position in the lateral direction in the first image correction processing S160, but may be set to be higher than the ratio of the second correction amount Cy2 to the first correction amount Cy1 for the change amount ΔPy of the eye position in the vertical direction (Cx2/Cx1>Cy2/Cy1).
(Step S181)

In Step S170 according to some embodiments, when it is determined that a predetermined cancellation condition is satisfied, the display control device 30 (the processor 33) transitions from the second image correction processing S170 to the first image correction processing S160.

The predetermined cancellation condition includes that a predetermined time (e.g., 20 seconds) has elapsed after a transition to the second image correction processing S170. The eye tracking image processing module 512 may measure the time after a transition to the second image correction processing S170 and determine that the cancellation condition is satisfied when the predetermined time previously stored in the memory 37 (or set by the operation detection unit 407) has elapsed.

Further, the predetermined cancellation condition may include that the predetermined condition is no longer satisfied in Step S120. Specifically, the predetermined cancellation condition may include detecting a transition from the state where the predetermined condition is satisfied to the state where the predetermined condition is no longer satisfied in at least one of Steps S131 to S136 and Steps S141 to S143. Furthermore, the predetermined cancellation condition may include that a predetermined time (e.g., 20 seconds) has elapsed after the predetermined condition is no longer satisfied in Step S120.
(Step S182)

In Step S170 according to some embodiments, when it is determined that the predetermined cancellation condition is satisfied, the display control device 30 (the processor 33) transitions to third image correction processing in which a third correction amount Cy3 of the image position for the change amount ΔPy of the eye position in the vertical direction is smaller than the first correction amount Cy1 in the first image correction processing S160 and is larger than the second correction amount Cy2 in the second image correction processing S170. For example, when the first correction amount Cy1 and the second correction amount Cy2 for the change amount ΔPy of the eye position in the vertical direction are 100% and 20%, respectively, the third correction amount Cy3 is 50%.
(Example of Step S182)

In Step S182 according to some embodiments, the display control device 30 (the processor 33) may gradually increase the correction amount over time such that the third correction amount Cy3 for the change amount ΔPy of the eye position in the vertical direction approaches the first correction amount Cy1 for the change amount ΔPy of the eye position in the vertical direction after a transition to the third image correction processing. For example, when the first correction amount Cy1, the second correction amount Cy2, and the third correction amount Cy3 for the change amount ΔPy of the eye position in the vertical direction are 100%, 20%, and 50%, respectively, the display control device 30 (the processor 33) may increase the third correction amount Cy3 over time so as to gradually approach the first correction amount Cy1 such that 55%→60%→65%→ . . . →100%.

Reference is again made to FIG. 10. The graphic module 514 of FIG. 10 includes various known software components to perform image processing, such as rendering, to generate image data and drive the display device 40. Furthermore, the graphic module 514 may also include various known software components to change the type (moving image, still image, shape), arrangement (location coordinates, angle), size, display distance (in the case of 3D), visual effect (e.g., luminance, transparency, saturation, contrast, or other visual characteristics) of images to be displayed. The graphic module 514 may generate image data and drive the light modulation device 50 so that the observer visually recognizes the image with the type of the image (one example of a display parameter), the location coordinates of the image (one example of the display parameter), the angle of the image (one example of the display parameter such as the pitch angle about the X-direction as an axis, the yaw rate angle about the Y-direction as an axis, and the rolling angle about the Z-direction as an axis), the size of the image (one example of the display parameter), the color of the image (one example of the display parameter set by hue, saturation, and brightness), and the strength of perspective representation of the image (one of the display parameters set by the position of a vanishing point).

The light source driving module 516 includes various known software components to execute driving of the light source unit 24. The light source driving module 516 may drive the light source unit 24 based on the set display parameter.

The actuator driving module 518 includes various known software components to execute driving of a first actuator 28 and/or a second actuator 29. The actuator driving module 518 may drive the first actuator 28 and the second actuator 29 based on the set display parameter.

FIG. 13 is a diagram illustrating the HUD device 20 according to some embodiments in which the relay optical system 80 (the curved mirror 81) is rotated so as to move the eye box 200 in the vertical direction. The display control device 30 (the processor 33) according to some embodiments may control for example the first actuator 28 to rotate the relay optical system 80 (the curved mirror 81) and move the eye box 200 in the vertical direction (the Y-axis direction). Typically, when the eye box 200 is disposed in an eye box 201 on a relatively upper side illustrated in FIG. 13, the position of the virtual image display region PS is the position indicated by the reference numeral PSI on a relatively lower side, and when the eye box 200 is disposed in an eye box 203 on the lower side illustrated in FIG. 13, the position of the virtual image display region PS is the position indicated by the reference numeral PS3 on a relatively upper side. The display control device 30 (the processor 33) according to some embodiments may execute the eye tracking image processing module 512 to reduce the correction amount Cy of the position of the image displayed on the light modulation device 50 for the change amount of the eye position (or head position) in the vertical direction when the eye box 200 is disposed on the upper side with respect to a predetermined height threshold (in other words, when the control value of the first actuator 28 exceeds an actuator control threshold such that the eye box 200 is disposed on the upper side with respect to the predetermined height threshold). Furthermore, the actuator driving module 518 may automatically change the height of the eye box 200 in accordance with the position of the eye position 700 (or the head position 710) in the vertical direction or may change the height of the eye box 200 in accordance with the operation of the user by the operation detection unit 407. Specifically, the eye tracking image processing module 512 may include a threshold, table data, arithmetic expression, and the like, to switch the correction amount Cy of the position of the image displayed on the light modulation device 50 for the change amount of the eye position (or head position) in the vertical direction from the information about the height of the eye box 200, the information about the control value of the actuator, the information about the position in the vertical direction of the eye position 700 (or the head position 710), with which the height of the eye box 200 may be automatically adjusted, the operation information from the operation detection unit 407 that adjusts the height of the eye box 200, and the like.

Furthermore, the display control device 30 (the processor 33) according to some embodiments may gradually or continuously decrease the correction amount Cy of the position of the image displayed on the light modulation device 50 for the change amount of the eye position (or the head position) in the vertical direction as the eye box 200 becomes higher than the predetermined height (in other words, as the control value of the first actuator 28 is changed so that the eye box 200 becomes higher). That is, the eye tracking image processing module 512 may include a threshold, table data, arithmetic expression, and the like, to adjust the correction amount Cy of the position of the image displayed on the light modulation device 50 for the change amount of the eye position (or head position) in the vertical direction from the information about the height of the eye box 200, the information about the control value of the actuator, the information about the position in the vertical direction of the eye position 700 (or the head position 710) with which the height of the eye box 200 may be automatically adjusted, the operation information from the operation detection unit 407 that adjusts the height of the eye box 200, and the like.

As described above, the display control device 30 according to the present embodiment is the display control device 30 that executes display control in the head-up display device 20 that includes at least the display device 40 that displays an image and the relay optical system 80 that projects light of the image displayed by the display device 40 on a projected member and causes a user of a vehicle to visually recognize a virtual image of the image superimposed on a foreground, the display control device 30 includes the one or more processors 33, the memory 37, and one or more computer programs that are stored in the memory 37 and are executed by the one or more processors 33, and the processor 33 acquires the eye position (and/or head position) Py of the user in the vertical direction of the vehicle and the eye position (and/or head position) Px in the lateral direction of the vehicle and switches between the first image correction processing S160 to correct a position of the image displayed on the display device 40 based on at least the eye position (or head position) Py in the vertical direction and the eye position (or head position) Px in the lateral direction and the second image correction processing S170 to correct the position of the image displayed on the display device 40 based on at least the eye position (or head position) Py in the vertical direction and the eye position (or head position) Px in the lateral direction, wherein the second correction amount Cy2 of the position of the image for the change amount $\Delta Py$ of the eye position (or head position) in the vertical direction is smaller than the first correction amount Cy1 of the position of the image for the change amount $\Delta Py$ of the eye position (or head position) in the vertical direction during the first image correction processing S160, or correct the position of the image displayed on the display device 40 based on at least the eye position (or head position) Px in the lateral direction, wherein the correction amount of the position of the image for the change amount $\Delta Py$ of the eye position (or head position) in the vertical direction is zero.

Furthermore, according to some embodiments, the processor 33 may select the second image correction processing S170 when at least one of the following conditions is satisfied: (1) the eye position (or head position) Px in the lateral direction continuously changes in one direction; (2) a change in the eye position (and/or head position) in the vertical direction and a change in the eye position (and/or head position) in the lateral direction are detected and, at this point, a ratio of the change amount $\Delta Py$ of the eye position (or head position) in the vertical direction to the change amount $\Delta Px$ of the eye position (or head position) in the lateral direction is less than the predetermined first threshold; and (3) a change in the eye position (or head position) Py in the vertical direction and a change in the eye position (or head position) Px in the lateral direction are detected and, at this point, the change amount $\Delta Py$ of the eye position (or head position) in the vertical direction is less than the predetermined second threshold. Thus, it is possible to reduce a sense of discomfort given to the observer due to the detection of the movement of the eye position (head position) in the vertical direction that the observer is not aware of when the observer moves the eye position (head position) in the lateral direction.

Furthermore, according to some embodiments, the processor 33 may select the second image correction processing S170 when a change in the eye position (or head position) Py in the vertical direction and a change in the eye position (or head position) Px in the lateral direction are detected after the eye position (and/or head position) Py in the vertical direction and/or the eye position (and/or head position) Px in the lateral direction are not acquirable. In other words, when a detectable state of one or more of the eye position Py in the vertical direction, the head position Py in the vertical direction, the eye position Px in the lateral direction, and the head position Px in the lateral direction transitions to an undetectable state in the first image correction processing S160, the processor 33 may shift to the second image correction processing S170.

Furthermore, according to some embodiments, in the second image correction processing S170, after a predetermined time elapses, the processor 33 may switch to the third image correction processing S182 to correct the position of the image displayed on the display device 40 based on at least the eye position (or head position) Py in the vertical direction and the eye position (or head position) Px in the lateral direction, wherein the third correction amount Cy3 of the position of the image for the change amount ΔPy of the eye position (or head position) in the vertical direction is smaller than the first correction amount Cy1 during the first image correction processing S160 and is larger than the second correction amount Cy2 during the second image correction processing S170.

Furthermore, according to some embodiments, in the second image correction processing S170, when it is detected that the change amount ΔPy in the eye position (or head position) in the vertical direction is larger than the predetermined third threshold, the processor 33 may switch to the third image correction processing S182 to correct the position of the image displayed on the display device 40 based on at least the eye position (or head position) Py in the vertical direction and the eye position (or head position) Px in the lateral direction, wherein the third correction amount Cy3 of the position of the image for the change amount ΔPy of the eye position (or head position) in the vertical direction is smaller than the first correction amount Cy1 during the first image correction processing S160 and is larger than the second correction amount Cy2 during the second image correction processing S170.

Furthermore, according to some embodiments, in the third image correction processing S182, the processor 33 may change the third correction amount Cy3 over time so as to approach the first correction amount Cy1 during the first image correction processing S160.

Furthermore, according to some embodiments, the head-up display device 20 may display the distant virtual image V1 (e.g., the virtual images V64 to V65 illustrated in FIG. 9) perceived at a position away from the reference point set at a side of the vehicle by the first distance and the near virtual image V2 (e.g., the virtual images V61 to V63 illustrated in FIG. 9) perceived at a position away from the reference point by the second distance shorter than the first distance, and the processor 33 may display the distant virtual image V1 by switching between the first image correction processing S160 and the second image correction processing S170 in accordance with satisfaction of the predetermined condition and display the near virtual image V2 by the second image correction processing S170 regardless of satisfaction of the predetermined condition. Specifically, the eye position state determination module 508 may include a threshold, table data, arithmetic expression, and the like, to determine whether each of the virtual images V is the distant virtual image V1 or the near virtual image V2 from the position information on the real object 300 that is associated with the virtual image V acquired from the vehicle exterior sensor 411, the information about the perception distance D30 set in the virtual image V based on the position information of the real object 300, and the like.

Furthermore, according to some embodiments, when a region where the virtual image V is displayable is the virtual image display region VS, as illustrated in FIG. 9, the head-up display device 20 may display the upper virtual image V60 displayed in the upper region VSα including the upper end VSu of the virtual image display region VS when viewed from the driver's seat of the vehicle and the lower virtual image V70 displayed in the lower region VSβ including the lower end VSb of the virtual image display region VS and below the upper region VSα, and the processor 33 may display the upper virtual image V60 by switching between the first image correction processing S160 and the second image correction processing S170 in accordance with satisfaction of a predetermined condition and display the lower virtual image V70 without performing position correction of the image based on the eye position or the head position.

Furthermore, according to some embodiments, as illustrated in FIG. 9, the head-up display device 20 may display the AR virtual image V60 whose display position is changed in accordance with a position of a real object present in the foreground of the vehicle and the non-AR virtual image V70 whose display position is not changed in accordance with the position of the real object, and the processor 33 may display the AR virtual image V60 by switching between the first image correction processing S160 and the second image correction processing S170 in accordance with satisfaction of a predetermined condition and display the non-AR virtual image V70 without performing position correction of the image based on the eye position or the head position.

The operations of the processing processes described above may be implemented by executing one or more functional modules of an information processing apparatus, such as a general-purpose processor or an application-specific chip. These modules, combinations of these modules, and/or combinations with known hardware that may replace their functions are all included in the scope of protection of the present invention.

The functional blocks of the vehicular display system 10 are selectively implemented as appropriate by hardware, software, or a combination of hardware and software to carry out the principles of the various embodiments described. It will be understood by those skilled in the art that the functional blocks described in FIG. 10 may be selectively combined as appropriate or one functional block may be separated into two or more sub-blocks to implement the principles of the described embodiments. Therefore, the description herein selectively supports as appropriate any possible combination or division of the functional blocks described herein.

DESCRIPTION OF REFERENCE NUMERALS

1: Vehicle
2: Projected portion
5: Dashboard
6: Road surface
10: Vehicular display system
20: HUD device
21: Light emission window
22: Housing
24: Light source unit
28: First actuator
29: Second actuator
30: Display control device
31: I/O interface
33: Processor
35: Image processing circuit
37: Memory
40: Display device
205: Center
300: Real object
311: Road surface
313: Person
314: Another vehicle

315: Building
401: Vehicular ECU
403: Road information database
405: Own-vehicle position detection unit
407: Operation detection unit
409: Eye position detection unit
411: Vehicle exterior sensor
413: Brightness detection unit
417: Portable information terminal
419: External communication device
502: Eye position detection module
504: Eye position estimation module
506: Eye position prediction module
508: Eye position state determination module
510: Vehicle state determination module
511: Eye position tracking image processing module
512: Eye tracking image processing module
514: Graphic module
516: Light source driving module
518: Actuator driving module
710: Head position
Cy1: First correction amount
Cy2: Second correction amount
Cy3: Third correction amount
D10: Imaging length
D30: Perception range
FU: Virtual object (perception virtual image)
K: Display light
PS: Virtual image display region
PT: Target position
Px: Eye position (head position) in lateral direction
Py: Eye position (head position) in vertical direction
V: Virtual image
V60: AR virtual image (upper virtual image)
V61: Navigation virtual image
V62: Navigation virtual image
V63: Emphasized virtual image
V64: Emphasized virtual image
V65: Emphasized virtual image
V65: POI virtual image
V70: Non-AR virtual image (lower virtual image)
VS: Virtual image display region
VSb: Lower end
VSu: Upper end
VSα: Upper region
VSβ: Lower region
Vx: Movement velocity
Vy: Movement velocity
t: Periodic time
ΔPx: Change amount
ΔPy: Change amount

The invention claimed is:

1. A display control device that executes display control in a head-up display device that includes at least a display device that displays an image and a relay optical system that projects light of the image displayed by the display device on a projected member and causes a user of a vehicle to visually recognize a virtual image of the image superimposed on a foreground, the display control device comprising:
one or more processors;
a memory; and
one or more computer programs that are stored in the memory and are executed by the one or more processors, wherein
the processor
acquires an eye position and/or a head position of the user in a vertical direction of the vehicle and an eye position and/or a head position of the user in a lateral direction of the vehicle, and
switches between
first image correction processing to correct a position of the image displayed on the display device based on at least the eye position or the head position in the vertical direction and the eye position or the head position in the lateral direction, and
second image correction processing to
correct the position of the image displayed on the display device based on at least the eye position or the head position in the vertical direction and the eye position or the head position in the lateral direction, wherein a second correction amount of the position of the image for a change amount of the eye position or the head position in the vertical direction is smaller than a first correction amount of the position of the image for the change amount of the eye position or the head position in the vertical direction during the first image correction processing, or
correct the position of the image displayed on the display device based on at least the eye position or the head position in the lateral direction, wherein a correction amount of the position of the image for the change amount of the eye position or the head position in the vertical direction is zero.

2. The display control device according to claim 1, wherein the processor selects the second image correction processing when at least one of the following conditions is satisfied:
the eye position or the head position in the lateral direction continuously changes in one direction;
a change in the eye position and/or the head position in the vertical direction and a change in the eye position and/or the head position in the lateral direction are detected and, at this point, a ratio of the change amount of the eye position or the head position in the vertical direction to a change amount of the eye position or the head position in the lateral direction is less than a predetermined first threshold; and
a change in the eye position or the head position in the vertical direction and a change in the eye position or the head position in the lateral direction are detected and, at this point, the change amount of the eye position or the head position in the vertical direction is less than a predetermined second threshold.

3. The display control device according to claim 1, wherein the processor selects the second image correction processing when a change in the eye position or the head position in the vertical direction and a change in the eye position or the head position in the lateral direction are detected after the eye position and/or the head position in the vertical direction and/or the eye position and/or the head position in the lateral direction are not acquirable.

4. The display control device according to claim 1, wherein, in the second image correction processing, after a predetermined time elapses, the processor switches to third image correction processing to correct the position of the image displayed on the display device based on at least the eye position or the head position in the vertical direction and the eye position or the head position in the lateral direction, wherein a third correction amount of the position of the image for the change amount of the eye position or the head position in the vertical direction is smaller than the first correction amount during the first image correction processing and is larger than the second correction amount during the second image correction processing.

5. The display control device-according to claim 1, wherein, in the second image correction processing, when it is detected that the change amount in the eye position or the head position in the vertical direction is larger than a predetermined third threshold, the processor switches to third image correction processing to correct the position of the image displayed on the display device based on at least the eye position or the head position in the vertical direction and the eye position or the head position in the lateral direction, wherein a third correction amount of the position of the image for the change amount of the eye position or the head position in the vertical direction is smaller than the first correction amount during the first image correction processing and is larger than the second correction amount during the second image correction processing.

6. The display control device according to claim 4, wherein, in the third image correction processing, the processor changes the third correction amount over time so as to approach the first correction amount during the first image correction processing.

7. The display control device according to claim 1, wherein
the head-up display device displays a distant virtual image perceived at a position away from a reference point set at a side of the vehicle by a first distance and a near virtual image perceived at a position away from the reference point by a second distance shorter than the first distance, and
the processor
displays the distant virtual image by switching between the first image correction processing and the second image correction processing in accordance with satisfaction of a predetermined condition, and
displays the near virtual image by the second image correction processing regardless of satisfaction of the predetermined condition.

8. The display control device according to claim 1, wherein, when a region where the virtual image is displayable is a virtual image display region, the head-up display device displays an upper virtual image displayed in an upper region including an upper end of the virtual image display region when viewed from a driver's seat of the vehicle and a lower virtual image displayed in a lower region including a lower end of the virtual image display region and below the upper region, and
the processor
displays the upper virtual image by switching between the first image correction processing and the second image correction processing in accordance with satisfaction of a predetermined condition, and
displays the lower virtual image without performing position correction of the image based on the eye position or the head position.

9. The display control device according to claim 1, wherein
the head-up display device displays an AR virtual image whose display position is changed in accordance with a position of a real object present in the foreground of the vehicle and a non-AR virtual image whose display position is not changed in accordance with the position of the real object, and
the processor
displays the AR virtual image by switching between the first image correction processing and the second image correction processing in accordance with satisfaction of a predetermined condition, and
displays the non-AR virtual image without performing position correction of the image based on the eye position or the head position.

10. A head-up display device comprising:
a display device that displays an image;
a relay optical system that projects light of the image displayed by the display device on a projected member;
one or more processors;
a memory; and
one or more computer programs that are stored in the memory and are executed by the one or more processors,
the processor
acquires an eye position and/or a head position of the user in a vertical direction of the vehicle and an eye position and/or a head position of the user in a lateral direction of the vehicle, and
switches between
first image correction processing to correct a position of the image displayed on the display device based on at least the eye position or the head position in the vertical direction and the eye position or the head position in the lateral direction, and
second image correction processing to correct the position of the image displayed on the display device based on at least the eye position or the head position in the vertical direction and the eye position or the head position in the lateral direction, wherein a second correction amount of the position of the image for a change amount of the eye position or the head position in the vertical direction is smaller than a first correction amount of the position of the image for the change amount of the eye position or the head position in the vertical direction during the first image correction processing, or correct the position of the image displayed on the display device based on at least the eye position or the head position in the lateral direction, wherein a correction amount of the position of the image for the change amount of the eye position or the head position in the vertical direction is zero.

11. A display control method in a head-up display device that includes at least a display device that displays an image and a relay optical system that projects light of the image displayed by the display device on a projected member and causes a user of a vehicle to visually recognize a virtual image of the image superimposed on a foreground, the display control method comprising:
acquiring an eye position or a head position of the user in a vertical direction of the vehicle and an eye position or a head position of the user in a lateral direction of the vehicle, and
switching between
first image correction processing to correct a position of the image displayed on the display device based on at least the eye position or the head position in the vertical direction and the eye position or the head position in the lateral direction, and
second image correction processing to
correct the position of the image displayed on the display device based on at least the eye position or the head position in the vertical direction and the eye position or the head position in the lateral direction, wherein a second correction amount of the position of the image for a change amount of the eye position or the head position in the vertical direction is smaller than a first correction amount of the position of the image for the change amount of the eye position or the head position in the vertical direction during the first image correction processing, or correct the position of the image displayed on the display device based on at least the eye position or the head position in the lateral direction, wherein a correction amount of the position of the image for the change amount of the eye position or the head position in the vertical direction is zero.

* * * * *